(12) United States Patent
Bremer

(10) Patent No.: US 11,080,947 B2
(45) Date of Patent: Aug. 3, 2021

(54) METHOD FOR TIMING MULTIPLE ENTITIES, TIMEKEEPING DEVICE AND TIMING APPLICATION

(71) Applicant: blue media labs GmbH, Seelze (DE)

(72) Inventor: Jan-Marco Bremer, Berlin (DE)

(73) Assignee: blue media labs GmbH, Seelze (DE)

( * ) Notice: Subject to any disclaimer, the term of this patent is extended or adjusted under 35 U.S.C. 154(b) by 525 days.

(21) Appl. No.: 16/064,106

(22) PCT Filed: Dec. 19, 2016

(86) PCT No.: PCT/EP2016/081731
§ 371 (c)(1),
(2) Date: Jun. 20, 2018

(87) PCT Pub. No.: WO2017/108683
PCT Pub. Date: Jun. 29, 2017

(65) Prior Publication Data
US 2018/0374281 A1  Dec. 27, 2018

(30) Foreign Application Priority Data

Dec. 22, 2015  (DE) ...................... 10 2015 226 597.8

(51) Int. Cl.
*G04F 1/00* (2006.01)
*G07C 1/10* (2006.01)
(Continued)

(52) U.S. Cl.
CPC .................. *G07C 1/10* (2013.01); *G01D 9/06* (2013.01); *G04F 1/005* (2013.01); *G06F 3/014* (2013.01);
(Continued)

(58) Field of Classification Search
CPC .. G04F 1/005; G04F 1/00; G01D 9/06; G07C 1/10; G07C 1/24
See application file for complete search history.

(56) References Cited

U.S. PATENT DOCUMENTS

| 4,505,595 A | 3/1985 | Rose et al. |
| 4,571,698 A | 2/1986 | Armstrong |

(Continued)

FOREIGN PATENT DOCUMENTS

| EP | 2503416 A1 | 9/2012 |
| JP | 882684 A | 3/1996 |

(Continued)

*Primary Examiner* — Sean Kayes
(74) *Attorney, Agent, or Firm* — The Webb Law Firm

(57) ABSTRACT

A method for simultaneously timing multiple entities uses a timekeeping device. During timing, each of the multiple entities runs through a process starting with a start time event in a start phase followed by at least one subsequent time event in a run phase. The method comprises the following steps. In the start phase, when a first start time event occurs, a first actuator is manually actuated and the manual actuation triggers the measuring and recording of a first start time by a time measuring means. In the run phase following the start phase, when a subsequent time event occurs, the first actuator is manually actuated and the manual actuation triggers the measuring and recording of a subsequent time by the time measuring means. The timekeeping device also includes an assignment means and a second actuator.

15 Claims, 9 Drawing Sheets

(51) Int. Cl.
*G07C 1/24* (2006.01)
*G01D 9/06* (2006.01)
*G06F 3/01* (2006.01)
*G06F 3/0488* (2013.01)

(52) U.S. Cl.
CPC .......... *G06F 3/017* (2013.01); *G06F 3/04886* (2013.01); *G07C 1/24* (2013.01)

(56) References Cited

U.S. PATENT DOCUMENTS

| | | | |
|---|---|---|---|
| 4,797,864 A | 1/1989 | Stano et al. | |
| 4,918,630 A | 4/1990 | Plouff et al. | |
| 6,967,903 B2* | 11/2005 | Guanter | G04G 11/00 368/224 |
| 7,522,477 B1 | 4/2009 | Sheldon | |
| 9,939,784 B1* | 4/2018 | Berardinelli | G06F 21/35 |
| 2003/0123329 A1* | 7/2003 | Guanter | G04R 60/12 368/82 |
| 2007/0100714 A1 | 5/2007 | Walker | |
| 2008/0288200 A1 | 11/2008 | Noble | |
| 2014/0018944 A1 | 1/2014 | Ko et al. | |
| 2014/0064042 A1 | 3/2014 | Rustenberg et al. | |
| 2015/0057944 A1* | 2/2015 | White | A61B 5/1118 702/19 |
| 2015/0057945 A1* | 2/2015 | White | A61B 5/7435 702/19 |
| 2015/0063081 A1 | 3/2015 | Sharples | |

FOREIGN PATENT DOCUMENTS

| | | |
|---|---|---|
| JP | 1172583 A | 3/1999 |
| WO | 2013134828 A1 | 9/2013 |

* cited by examiner

FIG 7

METHOD FOR TIMING MULTIPLE ENTITIES, TIMEKEEPING DEVICE AND TIMING APPLICATION

CROSS-REFERENCE TO RELATED APPLICATIONS

This application is the United States national phase of International Application No. PCT/EP2016/081731 filed Dec. 19, 2016, and claims priority to German Patent Application No. 10 2015 226 597.8 filed Dec. 22, 2015, the disclosures of which are hereby incorporated in their entirety by reference.

BACKGROUND OF THE INVENTION

Field of the Invention

The present disclosure relates to a method for timing multiple entities and to a timekeeping device.

The method for simultaneously timing multiple entities as described herein uses a timekeeping device, wherein during timing each of the multiple entities runs through a process starting with a start time event in a start phase followed by at least one subsequent time event in a run phase. The method comprises the following steps. In the start phase, when a first start time event occurs, a first actuator is manually actuated and the manual actuation triggers the measuring and recording of a first start time by a time measuring means. In the run phase following the start phase, when a subsequent time event occurs, the first actuator is manually actuated and the manual actuation triggers the measuring and recording of a subsequent time by the time measuring means.

Description of Related Art

Manual timekeeping devices let a human operator indicate the start and stop of an activity or process as well as, often times, noteworthy intermediate points in time of the activity or process. Activities or processes often relate to entities such as packets transitioning through a warehouse, products being processed in a factory or athletes going through an exercise consisting of multiple similar or different, consecutive steps such as running laps in a stadium, completing sections of a triathlon race or swimming lanes in a swimming pool.

The value of a manual timekeeping device consists of enabling a single human operator to measure times of entities in situations where, in particular,
a. the installation of an automatic time tracking device would be too expensive,
b. access to any automatically gathered times is delayed, yet the operator values immediate information or
c. the automatic identification of start, stop and intermediate timekeeping events is beyond the state of the art of event recognition devices.

A known arrangement in single-entity timekeeping devices is a stopwatch with a start/stop button, a lap/reset button and at least one mode button. Button functions may also be switched, e.g., a start/lap button and a stop/reset button. By the use of the one mode button the mode of the next run of the stopwatch can be adjusted and intermediate times of the previous timing process can be recalled one after the other. Intermediate times are typically shown either as the time interval that has passed since the last intermediate time point logged (lap time) or as the total time from the start of the timekeeping activity until this time point (split time). Manual timekeeping devices typically allow the operator to switch the display mode between split time and lap time, or display the last time point tracked as both lap time and split time.

Millions of these traditional timekeeping devices are still being sold either stand-alone as handheld stopwatches or embedded in other devices such as wrist watches, with high-end devices often distinguishing themselves just by the number of time points that the device can temporarily store.

Preserving total and split times for an entity usually involves a process where the operator takes all desired times to then take a break and write down final time and intermediate times. The operator does so by cycling through all time points with the push of one button and manually writing them down on paper or any other text processing device. Stopwatches exist that automate this process by means of a printer that has to be connected to the watch. The printer prints out the most recent timing history before resetting the watch's limited internal timing memory.

Often, multiple entities start into a process or activity at the same time or in close time proximity, some of them potentially at the same point in time, some slightly earlier or later. The challenges then are to
1. preserve start times for multiple groups of entities,
2. keep track of lap/split and final stop times for each entity and also
3. inspect current lap/split times of each entity with respect to their individual start times in real-time.

In the currently available solutions to these problems the operator has to
1. use multiple stopwatches, if there are entities starting at multiple points in time, and/or
2. estimate split times for entities that have started at different points in time in their head based on memorized start times per entity.

Ideally, a single operator with a single timekeeping device should be able to record, observe and preserve multiple times for multiple entities going through a common process. The entities start into it in close time proximity, yet arbitrary start configuration.

Devices that allow multiple entities to be timed concurrently by means of multiple device-managed timers exist today, for instance in the form of mobile apps. However, they share a central problem with the concurrent use of multiple, separate stopwatches: The operator has to place a finger over a different button for different entities on start and when taking split times. And this at a time, when the operator would have to concentrate on visually recognizing potentially multiple entities' reaching a certain event to take a time measurement in close time proximity. On top of this, using multiple devices or timers becomes confusing to the operator beyond a very limited number of entities that are timed. Usually two to three is the practical maximum.

JP 11072583A presents a stopwatch device capable of measuring time with respect to a plurality of objects by a simple operation one-handed and facilitating the control of measured data. For each of the objects an own numeric key is allocated for measurement.

WO2013/134828A1 presents a timekeeping device. The application discloses the use of a single button to record multiple overlapping time events, which would conventionally have required multiple separate actuators on a conventional stopwatch. The timekeeping device triggers solely a single start signal by use of a single start mode. The athletes start with previously configured, fixed time delays calculated from the manually triggered single start signal. The application does not disclose manually triggered, multiple start times. The application does also not disclose a manual reassignment of entities. Instead, the assignment of manually triggered subsequent times, lap times and final times, is solely done automatically by a predefined algorithm.

Even though the known arrangements offer solutions for the recording of multiple overlapping time events, they are not applicable to arbitrary situations of simultaneous manual timekeeping of multiple entities.

SUMMARY OF THE INVENTION

It is therefore an object of the present disclosure to provide a method for simultaneously timing multiple entities, a timekeeping device and a timing application that overcome the aforementioned restrictions. In particular, a first purpose is to disclose a timekeeping device, a method for simultaneously timing multiple entities and a timing application that require a minimal number of manual actuators, in order to support easy handling for the operator during timekeeping. A second purpose is to offer a high flexibility to the operator in the supported use cases of timing situations.

The restrictions of the known arrangements are vanquished by a method for simultaneously timing multiple entities using a timekeeping device, wherein the first actuator provides at least two different kinds of manual actuation during the start phase and the at least two different kinds of manual actuation trigger the time measuring and recording of multiple individual start times, such that an individual start time is recorded for each of the multiple entities, wherein the first kind of manual actuation triggers a first procedure of measuring and recording an individual start time for at least one of the multiple entities and the second kind of manual interaction triggers a second procedure of measuring and recording an individual start time for exactly one of the multiple entities, wherein the first procedure is different from the second procedure.

In a possible embodiment, the first procedure is designed to measure a common start time for a group of entities starting at the same point in time, and the measured common start time is recorded as an individual start time for each entity of the group. The second procedure is designed to measure a single start time for a single entity starting alone, and the measured single start time is recorded as an individual start time for the single entity.

The method offers a solution to measure and record individual start times for multiple entities triggered by arbitrary start time events. That is to say, the time intervals in between consecutive start time events do not have to be known before the start of the timing session.

By providing at least two different kinds of manual actuation during the start phase, different starting situations are handled. The individual start times of entities that start together at the same time are recorded with the aid of a first kind of manual actuation. Whereas the individual start times of entities that start one-by-one at different instances of time may are recorded with the aid of a second kind of manual actuation.

The time measurement means is designed to recognize and differentiate the different kinds of actuations acceptable by the first actuator. During start phase, the first kind of manual actuation triggers a first procedure of measuring and recording an individual start time. When the time measurement means recognizes that a first kind of manual actuation is accepted by the first actuator the time measurement means measures a start time and triggers the recording of the measured start time as an individual start time for at least one of the multiple entities. During start phase, the second kind of manual actuation triggers a second procedure of measuring and recording an individual start time. When the time measurement means recognizes that a second kind of manual actuation is accepted by the first actuator the time measurement means measures a start time and triggers to record the measured start time as an individual start time to exactly one of the multiple entities.

Furthermore, after an individual start time is measured and recorded for each of the multiple entities the method switches from the start phase into the run phase. In the run phase the method is designed to interpret manual actuations of the first actuator in only one uniform way. Each actuation of the first actuator during run phase triggers the time measuring and recording of a subsequent time. It is important to notice, that in the moment of actuation the operator does not have to consider for which entity the time measurement is triggered. The method allows that the operator just actuates the first actuator in a uniform way to trigger the measurement and recording of a subsequent time.

Another solution to achieve the mentioned purposes is to equip the timekeeping device with an assignment means and a second actuator. The method disclosed herein allows that the assignment means automatically assigns one of the multiple entities to each of the recorded individual start times and the subsequent times. After the automatic assignment a recorded time may be manually reassigned. To a first recorded time, either a recorded individual start time or a recorded subsequent time, to which is assigned a first entity, may be manually reassigned a second entity of the multiple entities by the use of the second actuator. The second actuator allows the manual selection of the second entity, and the manual selection of the first recorded time, as well as the linking of the selected second entity to the selected first recorded time. The linking of the selected second entity to the selected first recorded time by the second actuator triggers the assignment means to reassign the second entity to the first recorded time. Thus, the manually triggered time measuring and recording is chronologically separated from the manual reassignment of an entity. When an entity reaches a time event that a timekeeper wants to measure and record, she is able to pay full attention to the timely manual actuation of the actuator without having to define the actual entity that is measured and recorded.

Both methods disclosed before, the method which supports time measuring and recording of multiple individual start times by providing at least two different kinds of manual actuations by the first actuator and the method which supports manual reassignment of entities by the use of a second actuator can be combined.

Throughout this disclosure the notion "multiple entities" refers to two or more entities. The meaning of the notion "multiple" is accordingly.

The word "manual" expresses a movement or activity that may be performed by any part of a human body. It is therefore not restricted to a movement performed by hand.

The word "actuation" refers to an activation of an actuator, wherein the actuator may be any element that is able to recognize its activation and its deactivation. The word "tap" is used synonymously to "actuation". Likewise the word "tapped" is used synonymously to "actuated". Examples for actuators are buttons on a device, sensors of a touchscreen or sensors of any other user interface, that may be activated manually.

In a first embodiment the second actuator is provided by a touchable area on a touch screen. The touchable area displays at least a first record, composed of the first recorded time and its currently assigned first entity, and a second record, composed of a second recorded time and its currently assigned second entity. The manual actuation of the second actuator in order to reassign the second entity to the first recorded time is achieved by tapping on the second record, dragging it and dropping it onto the second record.

To the individual start times are automatically assigned the multiple entities by a starting order of the entities, wherein the starting order defines a linear order in which the multiple entities start to run through their processes.

The first actuator may be a button or a touchable area of a screen. The first actuator may also comprise one or more sensors. The manual actuation of the first actuator may be a press on a button or a touch on a touchable area of a screen or a gesture performed with a part of a body recognized by at least one sensor. For example, a gesture may be a wink with at least one eye.

The different kinds of manual actuation of the first actuator during start phase are distinguishable by a duration of the time interval between two consecutive manual actuations. The time measuring means may be designed to calculate the length of the time interval between two consecutive manual actuations.

A duration of the time interval between two consecutive manual actuations is distinguished by a rapid actuation time $T_R$ being predefined by the time measuring means. The rapid actuation time $T_R$ is a configurable parameter. A first kind of manual actuation may be provided by a rapid actuation. A rapid actuation is characterized by at least two consecutive actuations and each of respective time intervals between two consecutive actuations, in which the first actuator is not actuated, is shorter than the rapid actuation time $T_R$. A second kind of manual actuation is provided by a single actuation. A single actuation is characterized by strictly one manual actuation. During a first time interval before the strictly one manual actuation lasting for the rapid actuation time $T_R$ and a second time interval after the strictly one manual actuation lasting for the rapid actuation time $T_R$ no further actuation is performed.

A rapid actuation may be used to trigger the recording of one actuation time as a uniform start time for at least as many entities as consecutive actuations have occurred within the rapid actuation. Each actuation within time interval $T_R$ of the previous actuation triggers the recording of at least one individual start time, which is equal to the recorded individual start time of the previous actuation. The uniform start time is given by a time being measured when the first of the consecutive rapid actuations is performed.

The different kinds of manual actuation of the first actuator used during start phase may also be distinguished by at least a duration of the manual actuation and/or a strength of a force acting upon the first actuator during manual actuation and/or a kind of a gesture performed during the manual actuation.

A duration of the manual actuation is distinguished by a hold time $T_H$ being predefined by the time measuring means. The hold time $T_H$ is a configurable parameter. A short actuation is a manual actuation, which lasts shorter than the hold time $T_H$. A long actuation is a manual actuation, which lasts longer than the hold time $T_H$. A single actuation is characterized by a short actuation or a long actuation wherein during a first time interval before the single actuation lasting for the rapid actuation time $T_R$ and a second time interval after the single actuation lasting for the rapid actuation time $T_R$ no further actuation is performed. The second kind of measuring and recording an individual start time may be provided by one single short actuation of the first actuator. A third kind of measuring and recording an individual start time may be provided by one single long actuation of the first actuator.

A strength of a force acting upon an actuator during manual actuation is distinguished by an actuation force $F_A$ being predefined by the time measuring means. A light actuation is a manual actuation which acts upon an actuator with a strength of force which is lower than the actuation force $F_A$. A deep actuation is a manual actuation which acts upon an actuator with a strength of force which is higher than the actuation force $F_A$. A single actuation is characterized by a light actuation or a deep actuation wherein during a first time interval before the single actuation lasting for the rapid actuation time $T_R$ and a second time interval after the single actuation lasting for the rapid actuation time $T_R$ no further actuation is performed. The second kind of measuring and recording an individual start time may be provided by one single light actuation of the first actuator. A third kind of measuring and recording an individual start time may be provided by one single deep actuation of the first actuator.

At least two kinds of gestures, a first gesture and a second gesture, performed by a part of a body being, are predefined by the time measuring means. The at least two kinds of gestures being predefined are recognizable by at least a sensor. The second kind of measuring and recording an individual start time may be provided by one single first gesture. A third kind of measuring and recording an individual start time may be provided by one single second gesture.

The second kind of manual actuation of the first actuator may be used to trigger the measurement of an actuation time, and the actuation time is recorded as an individual start time for one individual entity. The third kind of manual actuation of the first actuator may be used to trigger the measurement of an actuation time, wherein the actuation time is recorded as individual start time for those of the multiple entities that have not yet been assigned to an individual start time.

The actuation time is measured at the start of the respective kind of manual actuation of the first actuator.

The start phase is finished and the run phase is entered with the recognition of the first subsequent manual actuation, after an individual start time is assigned to each of the multiple entities.

In the run phase to each of the recorded possibly multiple subsequent times is automatically assigned one of the multiple entities by the assignment means. The assignment means may use a circular order of the entities for the automatic assignments of the entities. The circular order is defined by a linear order, wherein in the circular order the last entity of the linear order is succeeded by the first entity of the linear order. The linear order may be the starting order of the multiple entities. The linear order may also be any other order that is received from the starting order by possibly repeated manual reassignment of the multiple entities. The linear order gives the sequence in which the multiple entities are expected to arrive when subsequent time events occur that are to be triggered. A circular order implies that the entity, whose last time record is furthest in the past, that is, the least, recently timed entity, defines the successor to a current entity. The assignment means may also calculate for each subsequent time the most probable entity from the multiple entities to assign to. The calculation may be based on a statistical method. The statistical method evaluates recorded times from preceding time measurings for each of the multiple entities. The statistical method calculates to a measured time the most probable entity to assign to.

When one entity passes another entity, the automatic assignment by circular order fails. Therefore a manual reassignment is provided. The use of a circular order requires to only reassign a single entity to another recorded time manually. To a first recorded time of the possibly multiple recorded times, which is currently assigned a first entity of the multiple entities, may be reassigned a second entity of the multiple entities by a manual actuation of a second actuator, whereby to the first recorded time is assigned the second entity.

By manually reassigning to the first recorded time the second entity which was assigned to a second recorded time before, to the second recorded time as well as to any other recorded times that were recorded between the first recorded time and the second recorded time are reassigned a new entity from the multiple entities.

The second actuator may comprise a button. The second actuator may also be a touchable area on a screen. The second actuator may also comprise one or more sensors. The manual actuation of the second actuator may be a drag and drop touch on a touchable area of a screen or a gesture performed with a part of a body recognized by at least a sensor.

The second actuator may be a second touchable area on a touch screen, wherein the second touchable area displays the time records with their currently assigned entities, and the manual actuation of the second touchable area is achieved by tapping on the time record to which the second entity is presently assigned, dragging it to the time record, that is currently assigned the first entity and dropping it. Tapping means touching the touchable area such that the touch is recognized by the touchable area. Dragging an entity means moving the entity from a first location on a touch screen to a second location on a touch screen.

By the reassignment of the second entity from a second recorded time, which is either a recorded individual start time or a recorded subsequent time, to which the second entity was assigned before the reassignment, to the first recorded time, the circular order of the multiple entities is changed to a new circular order in such a way, that the second entity is removed from its current order position and is moved to a new order position. The new order position can be distinguished by the relation of the first recorded time to the second recorded time. If the second recorded time succeed the first recorded time, the second entity is the predecessor of the first entity, and the possibly multiple recorded times that succeed the first recorded time, are reassigned according to the new circular order. If the second recorded time precede the first recorded time, the second entity is the successor of the first entity, and the possibly multiple subsequent times that precede the first recorded time, but do not precede the second recorded time, are reassigned according to the new circular order.

In a specific embodiment, to the first recorded time of the possibly multiple recorded times, to which is currently assigned the first entity of the multiple entities, may be reassigned the second entity of the multiple entities, which is currently assigned to a second recorded time, only if the first recorded time succeed any other recorded time that is currently assigned to the first entity and the second recorded time succeed any other recorded time that is currently assigned to the second entity. Differently said, a reassignment is only possible for the respective last recorded times the multiple entities are assigned to.

The method further comprises the following steps. Firstly, the recorded first start time during the start phase is recorded as an absolute clock time measured with respect to a timer. Secondly, the recorded multiple individual start times during the start phase are recorded as time intervals measuring the elapsed time since the first start time. Thirdly, the recorded possibly multiple subsequent times during the run phase are also recorded as time intervals measuring the elapsed time since the first start time. And fourthly, a multi time series of recorded times is established comprising, in the order of their recording, the first start time, the multiple individual start times, the possibly multiple subsequent times, wherein to each recorded time is assigned one of the multiple entities.

The recorded first start time is also recorded as a world start time measured with respect to a world clock timer that indicates an absolute world time.

The method further comprises the following steps. By a manual actuation of a third actuator a save phase is entered. The recorded times for each of the multiple entities are saved. For each of the multiple entities an individual time series is extracted from the multi time series of recorded times, wherein the individual time series comprises an individual start time to which is assigned the respective entity, possibly multiple subsequent times to which are assigned the respective entity, wherein the subsequent time that is the final recorded time to the respective entity is called an individual final stop time, and in case there are preceding subsequent times that are recorded to the respective entity, these preceding possibly multiple subsequent times are called individual split times. Subsequently, for each of the multiple entities its individual time series is saved.

For each individual time series the respective individual start time is saved as an absolute clock time calculated from the absolute clock time of the first start time and the elapsed time from the first start time to the respective individual start time, and the respective possibly multiple individual split times and the respective individual final stop time are saved as time intervals measuring the elapsed time since the respective individual start time.

The individual time series are saved in a memory of the timekeeping device.

Note that the step of displaying the recorded times on a display unit is not described in detail herein. Usually a display unit is designed in such a way, that it shows individual times for each entity. An individual time may be the individual start time, one of the individual split times or the individual final stop time. It is worth to mention, that an individual split time or an individual final stop time depends on the individual start time. Therefore, the manual reassignment of an entity may have an impact on the indicated individual times. When a second entity is reassigned to a recorded subsequent time, to which a first entity was assigned before, and the first and second entity have different individual start times, then the indicated subsequent time shown by the display unit has to change according to the individual start time of the second entity. Even though, the recorded subsequent time expressed as elapsed time since the first start time remains the same.

The method further comprises the following additional step. In a select mode the plurality of entities, that are to be timed, are manually chosen and their starting order is determined.

The restrictions of the known arrangements are also vanquished by a timekeeping device for simultaneously timing multiple entities, wherein during timing each of the multiple entities runs through a process starting with a start time event in a start phase followed by at least one subsequent time event in a run phase. The timekeeping device comprises a first actuator designed to be manually actuatable wherein a manual actuation of the first actuator triggers the time measurement for an event to be timed. The timekeeping device further comprises a time measuring means for time measuring of events, wherein through a manual actuation of the first actuator the time measuring means is triggered to measure and record an actuation time. The time measuring means is designed to measure and record at least a first start time in the start phase and multiple subsequent times in the run phase. The first actuator provides at least two different kinds of manual actuation during the start phase. The at least two different kinds of manual actuation allow the capturing of individual start times for different starting situations, such that an individual start time may be recorded for each of the multiple entities. The time measurement means is designed to recognize and differentiate the different kinds of manual actuations accepted by the first actuator during start phase. The recognized kind of manual actuation determines the recording of an actuation time as an individual start time to one or more of the multiple entities. When a first kind of manual actuation is recognized a first procedure of measuring and recording individual start times is executed. When a second kind of manual actuation is recognized a second procedure of measuring and recording individual start times is executed.

The timekeeping device allows the simultaneous timing of multiple entities by manual actuation of just a single element, that is the first actuator. The first actuator supports the capturing of both individual start times and subsequent times for each of the multiple entities. Subsequent times may be intermediate times or final stop times. The timekeeping device offers a high flexibility by supporting complex starting situations. The first actuator is designed to trigger the measurement of individual start times for situations where a group of entities start at the same time as well as for situations where at one point in time only a single entity starts.

When individual start times for all of the multiple entities are recorded, that is in the run phase of a timing session, the first actuator and the time measuring means have a different behavior. The first actuator does not support different kinds of manual actuation in the run phase. Instead each manual actuation of the first actuator is interpreted by the time measuring means in one uniform way. Each actuation of the first actuator during run phase triggers the time measuring means to measure and record a subsequent time.

The timekeeping device is provided and designed for carrying out a method as disclosed beforehand.

The timekeeping device may further comprise an assignment means for assigning and reassigning to a recorded time one of the multiple entities. The recorded time may be either one of the recorded individual start times or one of the recorded subsequent times. Besides, the timekeeping device comprises a second actuator, wherein the second actuator is designed to enable a manual selection of a second entity of the multiple entities that is currently assigned to a second recorded time and a manual selection of a first recorded time to which is currently assigned a first entity of the multiple entities and a manual linking of the selected second entity to the selected first recorded time. The second actuator is further designed to trigger the assignment means to reassign the second entity to the first recorded time, when the second actuator observes the manual linking of the selected second entity to the selected first recorded time.

In particular, the assignment means provides reassignment, if the first recorded time and the second recorded time are either both measured during start phase or both measured during run phase.

In a possible embodiment, the second actuator may be designed as a second touchable area on a touch screen. The second touchable area displays at least a first record, composed of the first recorded time and its currently assigned first entity, and a second record, composed of a second recorded time and its currently assigned second entity. The manual actuation of the second actuator, in order to reassign the second entity to the first recorded time, is achieved by manually selecting the second entity by tapping on the second record, manually selecting the first recorded time by dragging the second record to the first record and manually linking of the selected second entity to the selected first recorded time by dropping the second record onto the first record.

In a first embodiment, the first actuator is designed as a physical button of the device. In a start phase, the button is in a rest mode, when the button is not pressed and the button is in a tap mode, when the button is actuated through pressing. The tap mode lasts from the start of the pressing of the button until the release of the button.

In a second embodiment, the first actuator is designed as a first touchable area on a touch screen. For example, the first touchable area is a graphical user interface element. The graphical user interface element is furnished with a definite logic, when manually touched. In a start phase the first touchable area is in a rest mode, when the first touchable area is not touched. The first touchable area is in a tap mode, when the first touchable area is actuated through a touch. The tap mode lasts from the start of the touch until the release of the touch.

In a third embodiment, the first actuator includes at least a first sensor. The at least first sensor is designed to measure the strength of a force acted upon the first actuator.

In a forth embodiment, the first actuator includes at least a second sensor. The at least second sensor is designed to recognize the kind of gesture that is manually performed. For example, the at least second sensor is included in an electronic glove and the gesture is performed with the electronic glove.

The tap mode is considered a short tap, in case the tap mode lasts shorter than a predefined and configurable hold time $T_H$ or a long tap, in case the touch mode lasts at least for the predefined hold time $T_H$.

The timekeeping device further comprises a world clock timer and the recorded first start time is measured with respect to the world clock timer that indicates an absolute world time.

The timekeeping device further comprises a selection means to select the plurality of entities, that are to be timed, from a set of predefined entities.

The timekeeping device is used for the timing of sports events.

Another solution to achieve the above mentioned purposes of this disclosure is provided by a second timekeeping device for simultaneously timing multiple entities, wherein during timing each of the multiple entities runs through a process starting with a start time event in a start phase followed by at least one subsequent time event in a run phase. The second timekeeping device comprises a first actuator designed to be manually actuatable wherein a manual actuation of the first actuator triggers the time measurement for an event to be timed. The second timekeeping device further comprises a time measuring means for time measuring of events, wherein through a manual actuation of the first actuator the time measuring means is triggered to measure and record an actuation time. The time measuring means is designed to measure and record at least a first start time in the start phase and multiple subsequent times in the run phase. The second timekeeping device further comprises an assignment means for assigning and reassigning to a recorded time one of the multiple entities. The recorded time may be one of the recorded subsequent times. Besides, the second timekeeping device comprises a second actuator, wherein the second actuator is designed to enable a manual selection of a second entity of the multiple entities that is currently assigned to a second recorded time and a manual selection of a first recorded time to which is currently assigned a first entity of the multiple entities and a manual linking of the selected second entity to the selected first recorded time. The second actuator is further designed to trigger the assignment means to reassign the second entity to the first recorded time, when the second actuator observes the manual linking of the selected second entity to the selected first recorded time.

In a possible embodiment, the second actuator of the second timekeeping device may be designed as a second touchable area on a touch screen. The second touchable area displays at least a first record, composed of the first recorded time and its currently assigned first entity, and a second record, composed of a second recorded time and its currently assigned second entity. The manual actuation of the second actuator, in order to reassign the second entity to the first recorded time, is achieved by manually selecting the second entity by tapping on the second record, manually selecting the first recorded time by dragging the second record to the first record and manually linking of the selected second entity to the selected first recorded time by dropping the second record onto the first record.

And a mobile device is disclosed, whereby the mobile device comprises a timekeeping device as claimed above.

The mobile device may be a tablet computer or a smart phone or a wearable computer or a stopwatch.

The present disclosure also comprises a timing application, storable on a medium readable by a mobile device. The timing application is designed to execute the steps of a method for simultaneously timing multiple entities as disclosed beforehand, when run on a mobile device comprising a timekeeping device, either a first or a second timekeeping device, as described before.

BRIEF DESCRIPTION OF THE DRAWINGS

Further details and advantages of the present disclosure will become clear from the description below of exemplary embodiments with reference to the figures, in which:

FIG. 7 shows a second sequence of the display unit during the timing process.

DETAILED DESCRIPTION OF THE INVENTION

Figure 1:
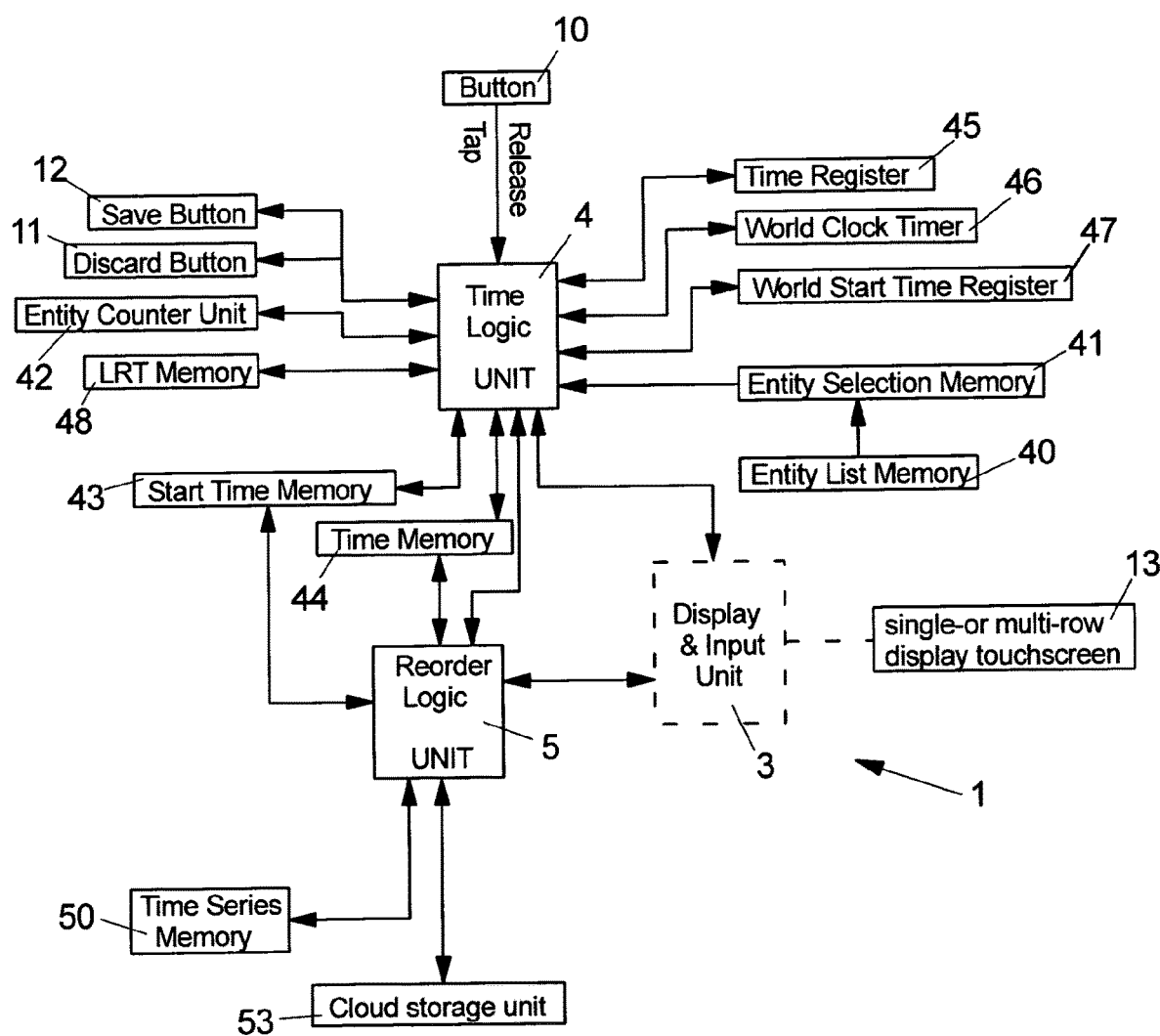
FIG. 1 is a diagram showing the major components of a possible embodiment of a timekeeping device.

The invention detailed in the following discloses a sophisticated single-button multi-stopwatch that enables timekeepers to take start, split and stop times for multiple entities simultaneously, accurately and easily by blindly tapping just one button at the critical time. The multi-stopwatch is ready to use with minimal prior setup. It is designed for use cases, where handheld timing is still the preferred or only possible timing option.

Definitions

| | |
|---|---|
| Operator | A single person that operates the timekeeping device. |
| Entity | A physical or virtual object to be timed. |
| Event | A situation in the real world that marks a relevant point in time to be preserved as an entity-specific time record. |
| Start Event | A special event that marks the beginning of a timing session and individual entities' participation therein. (Also just: Start.) |
| Individual Start Time | The relative time (usually in milliseconds) elapsed since the start of a timing session. The individual start time of a single entity or multiple entities starting first in a timing session have a individual start time of 0. All other entities' individual start time is larger than 0. |
| Split Event | Any event that is not a start event for any entity within a timing session. |
| Individual Split Time | The relative time elapsed since a start event. |
| Stop Event | The final split event for an entity. The timekeeping device of the present disclosure does not require an operator to mark events as stop events explicitly. The timekeeping device keeps on running always. The last split event when saving a timing session implicitly is a stop event. |
| Timing Session | A single process of preserving times for multiple entities, starting with the start of the first entity and ending with the saving or discarding of all time records recorded. Has a multi time series underlying. |
| Multi Time Series | A time series consisting of a single world time value and ordered set of time intervals, each time interval accompanied by an entity that the time is presently thought to relate to. |

| | |
|---|---|
| Individual Time Series | A world time value, that is, an absolute time value consisting of a date and time-of-day value (and potentially a time zone) plus an ordered set of time intervals relative to the world time value plus the entity these data items are related to. Represents the start of a specific entity into a process or activity and the times of any significant, related events afterwards until the end of the process or activity. |
| Time Record | A time interval and entity this interval relates to, plus potentially various added contextual information such as the sequence number of the record, as part of a timing session. |
| Start Time Record | A time record that is the first time record for an entity within a timing session. |
| Reorder logic | A reorder logic is an assignment means, which assigns an entity to a recorded time in the first place and also reassigns a new entity to a recorded time. |

FIG. 1 shows the major components of a first embodiment of a timekeeping device 1 according to the present disclosure. The timekeeping device 1 comprises a time logic unit 4 to which a main button 10 is attached. The main button 10 is used to indicate start and split events. The main button 10 recognizes tap, release and hold actions. Connected to the time logic unit 4 are, furthermore, a button time register 45, in particular one that holds a session time. The time logic unit 4 cooperates with a save button 12 and a discard button 11 by which the user can indicate the end of a timing session. The time logic unit 4 further cooperates with a world clock timer 46, in particular one from a built-in clock. The time logic unit 4 cooperates in particular with a world clock timer 46 that counts the number of milliseconds elapsed since a reference date and time (EPOCH). Moreover, the time logic unit 4 stores the world time of the initial start time of a timing session in a world start time register 47. The time logic unit 4 also stores the times of all recorded start time events in a start time memory 43. The start time memory 43 is also accessible by a reorder logic unit 5, that assigns entities 21, 22, 23, 24, 25 to the start times stored in the start time memory 43. The reorder logic can also change the assignment of entities 21, 22, 23, 24, 25 to start times. Additionally, the time logic unit 4 cooperates with a run time memory 44, which holds times and their presently assigned entities 21, 22, 23, 24, 25 for all recorded times beyond the start times. Furthermore, the time logic unit 4 cooperates with an entity counter unit 42 that stores the current total and started number of entities 21, 22, 23, 24, 25 being timed; an entity selection memory 41 that represents the ordered set of these timed entities, which themselves are selected from the full list of entities that are stored in the entity list memory 40. Also connected to the time logic unit 4 is the reorder logic unit 5 that is responsible for predicting and adapting the present assignments of entities 21, 22, 23, 24, 25 to times when the user manually changes parts of such assignments through the display and input unit 3. In addition, the reorder logic unit 5 delivers real-time information to the display and input unit 3 while the user changes entity assignments. To facilitate the initial, automatic assignment of an entity 21, 22, 23, 24, 25 to a time, a Least-Recently-Timed (LRT) memory 48, which is connected to the time logic unit 4, keeps the most recent start or run time recorded for every entity 21, 22, 23, 24, 25. The display and input unit 3 is connected to both the time logic unit 4 and the reorder logic unit 5. The display and input unit 3 can be designed in the form of a single- or multi-row display touch screen 13. The display and input unit 3 may also comprise a display unit, such as a monitor or direct eye camera projection system. Moreover, the display and input unit 3 may comprise an input device, such as, for example, a separate touch field, a glove interface, a camera-based or direct-brain-interfacing gesture recognition system.

In particular, the further above mentioned actuators like the first actuator 10, the second actuator 20 and/or the third actuator 12, and further actuators like a discard actuator 11 for discarding a timing session may be designed as physical buttons. For example, they can be designed as a start button 10, a discard button 11 and/or a save button 12 as shown in FIG. 1. They may also be designed as touch sensitive areas on a touch screen. They may also be designed as a combination of physical buttons and touch sensitive areas on a touch screen. For example, the first actuator 10 may be an area on the touch screen that is used to display the current session time, that is, the time since the first start time 14, when the first entity 21 started within the current timing session. The third kind of actuation of the first actuator 10 may be a long press on the touch screen or a deep press on a screen that can identify the intensity of a press on the screen. Finally, the actuators may also be designed as virtual buttons that are activated through, for example, gestures recognized through a connected glove, camera system or direct brain interface. For example, through a glove-based gesture recognition system, the operator would put the stopwatch in an alert state, which separates everyday gestures of the hands from stopwatch-specific gestures, by forming a first on one hand and then using the touch of thumb and index finger of the other hand (a) briefly to indicate a short actuation and (b) longer to indicate a long actuation, where times that separate the interpretation of taps as short or long can be in line with those times defined for taps on a touch screen.

Accordingly, actuation sequences to select and move entities 21, 22, 23, 24, 25 as they are assigned to time records can, for example, be indicated by again forming a first on the one hand and by closing all fingers of the other hand except for the index finger, which would position a virtual cursor on the top-most time record. Subsequently, moving the index finger or the entire hand down to move this cursor to a time record with the entity 21, 22, 23, 24, 25 to be selected and re-assigned. Afterwards, pulling the index finger in to indicate the selection of the entity 21, 22, 23, 24, 25. And then moving the index finger or the hand to position the lifted entity over the target time record and pushing the index finger out again to conclude the moving of the entity 21, 22, 23, 24, 25 to the target time record.

The same, a similar or an equivalent gesture may be recognized by a purely camera-based gesture recognition system for the same effect. Moreover, systems to detect individual eye blinks or sequences thereof can be used to indicate taps and long taps through short and long blinks. Existing eyeball tracking systems in conjunction with a configurable blink sequence can be utilized to select and move time records.

Advances in neurological brain interfaces, finally, may, for example, detect the thought of "tap" and "long tap" or thoughts of other configurable objects. For the sake of timekeeping, an identified thought like "tap" or "long tap" may be also handled as a manual actuation.

In conclusion, the meaning of actuation as well as tap, release and hold actions thus refer to actions on any of the actuators mentioned beforehand.

And in an enhancement the timekeeping device 1 additionally comprises the following components, which are connected to the reorder logic unit 5: A local time series memory 50 to preserve time series from prior timing sessions and an extension thereof through a cloud storage unit 53 that preserves even further history for a set of present and past entities beyond the locally managed entities.

The timekeeping device 1 contains a single timer 46 of sufficient accuracy, to the millisecond at least, that continuously runs and represents the current absolute world time, also called world clock time. The timekeeping device 1 then uses the world clock timer 46 to measure times within a timing session as well as the duration that the start button 10 is being pressed and the time interval between consecutive button taps, by preserving the world time at one point in time and deducting it from subsequent times to calculate the elapsed time. Of course, separate timers can be used for the same purpose, in particular: A world clock, a button timer, and a session timer.

Figure 2:
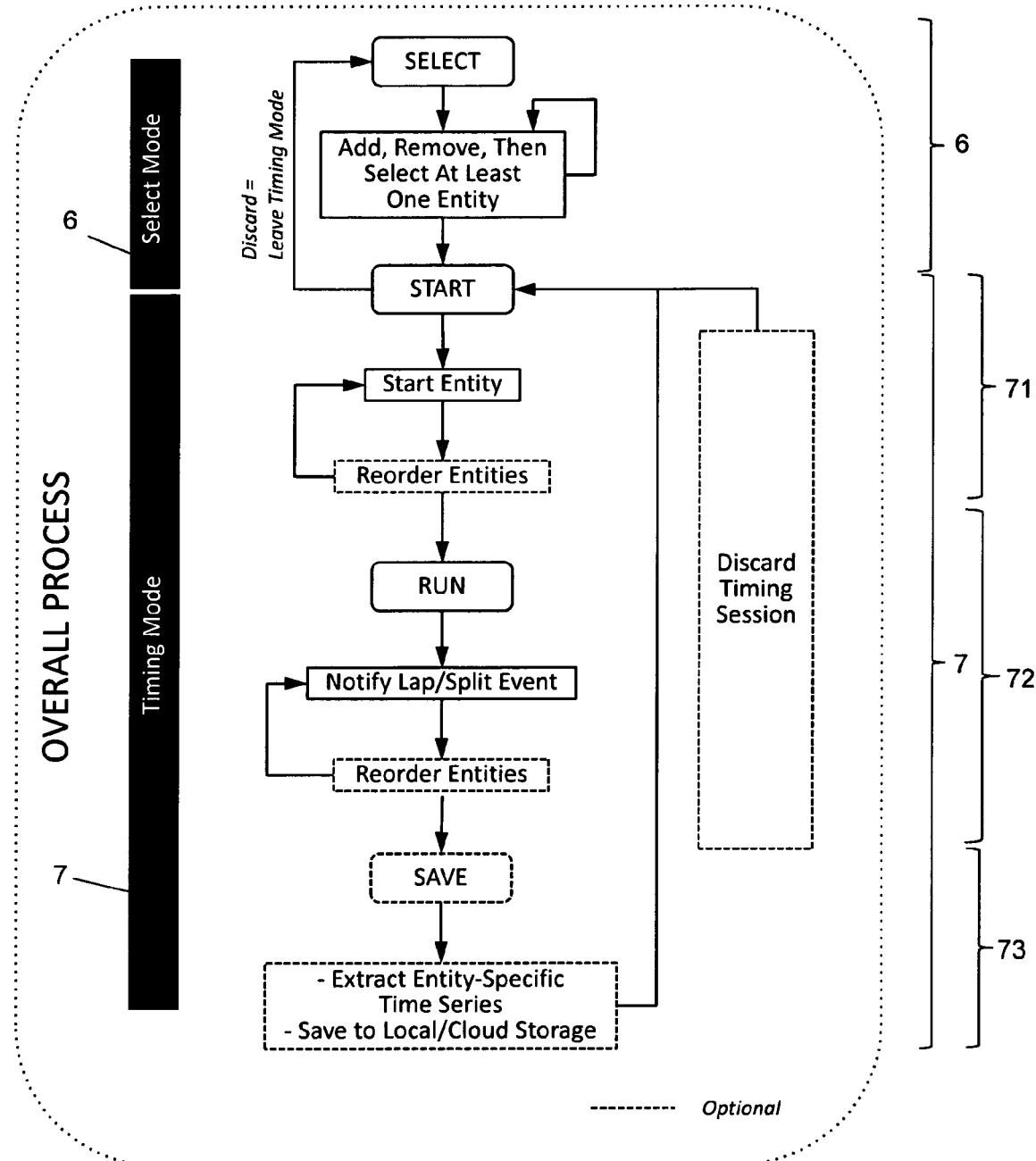
FIG. 2 is a flow chart diagram for the overall process of simultaneously timing multiple entities.

As shown in FIG. 2, the timekeeping device 1 operates in two major modes: A select mode 6 and a timing mode 7.

In a default mode, which is the select mode 6, the operator defines all entities 21, 22, 23, 24, 25, . . . to be timed by adding and removing entity definitions that usually consist at least of a unique short name. Entity definitions are permanently preserved in an entity list memory 40. The operator then selects the entities 21, 22, 23, 24, 25 to be timed in the single next timing session or sequence of timing sessions. If and only if there are any entities 21, 22, 23, 24, 25 presently selected, the timekeeping device 1 lets the operator switch the timekeeping device 1 into timing mode 7, for example, by means of a swipe from the selection screen 60 to the timing screen 70 on a typical smartphone-like device.

In timing mode 7, the timekeeping device 1 repeatedly goes through three distinct phases:

1. A start phase 71 in which the operator indicates the individual start time 15 for each and every entity 2. The timing session starts with the first start of any entity 21, 22, 23, 24, 25, as indicated by the operator as first start time 14. In both start and following run phase, the operator can manually change the automatic default assignment of an entity to a recorded time, that is, reorder entities.

2. A run phase 72 in which the operator indicates any number of intermediate events for which a time record 16 (split or final stop time) for a specific entity 21, 22, 23, 24, 25 is to be created within a multi-entity time series 720 (short: multi time series).

3. A save phase 73 in which the operator indicates the end of the timing session, and the timekeeping device 1 then extracts individual time series 730 for every entity 21, 22, 23, 24, 25 from the multi time series 720, while taking each entity's 21, 22, 23, 24, 25 last time record as the entity's individual final stop time 18, and saves these.

At any point in time in timing mode 7, if a timing session is in progress, the operator can end the session, reset the timekeeping device 1 and return to the beginning of start phase 71 by pressing the discard button 11. If no timing session is in progress, pressing the discard button 11 returns the timekeeping device 1 into select mode 6. If a timing session is in progress, all entities 21, 22, 23, 24, 25 have started, and at least one split event has been indicated by the operator, (a) the save button 12 gets enabled, (b) tapping the save button 12 preserves all individual time series 730 for entities 21, 22, 23, 24, 25 with more than a start time record to then (c) reset the timekeeping device 1 by clearing the current multi time series 720 and returning to the initial state of timing mode 7.

A multi time series 720, as used within a timing session in progress, as well as an individual time series 730, as saved by the timekeeping device 1 after the session's completion, comprises a world start time $w_0$, the absolute time at which the time series 720, 730 began. A multi time series 720 as well as an individual time series 730 also comprises a series of time intervals that are relative to the world start time $w_0$ and typically measured in milliseconds elapsed since the world start time $w_0$.

Figure 3:
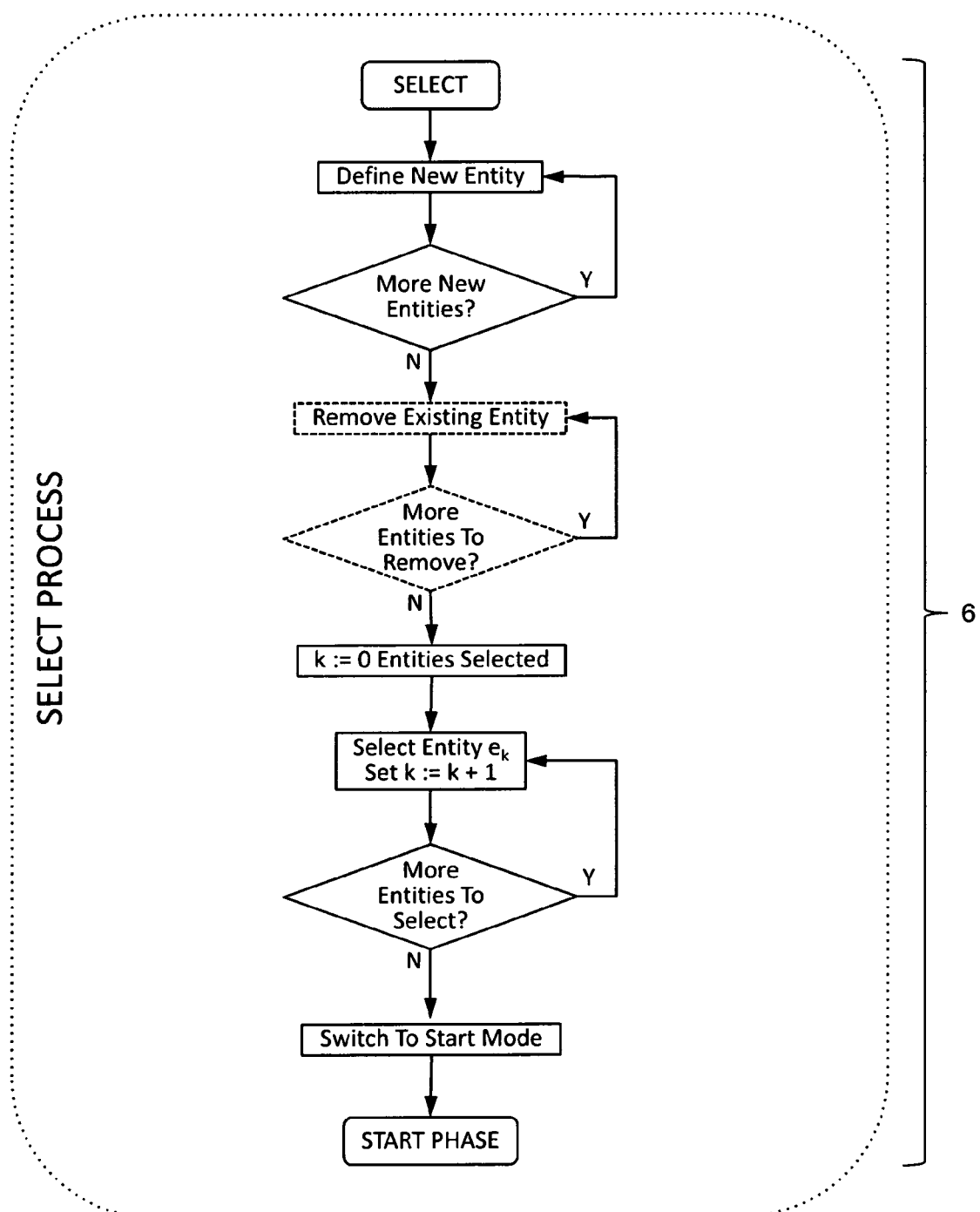
FIG. 3 is a flow chart diagram for the select process.

As indicated in FIG. 3, in select mode 6, the operator specifies a sequence of named entities 21, 22, 23, 24, 25. Ideally, but not necessarily, the operator orders the specified entities 21, 22, 23, 24, 25 by their assumed average speed for completing typical activities or processes to be timed. For every timing session, the operator selects a subsequence of these entities. For both of these operational steps, a tappable multi-line display 13 of sorts or any other mechanism to specify a name and change the order of these names on a display 13 can be used. In particular, entering such data can also happen (a) through a connected device such as a smartphone being connected to a smartwatch, the latter being responsible for the timekeeping, or (b) through a connection to a central cloud service with dedicated means to enter entity data, for example, on a web platform. Only when the operator has selected at least a single entity 21, 22, 23, 24, 25 does the timekeeping device 1 allow itself to be switched into timing mode 7, where start and intermediate times 15, 16 for the selected entities 21, 22, 23, 24, 25 can be tracked in one or more timing sessions.

Because of its prominent role for the timekeeping device 1 the start button 10 is indicated in an abbreviatory manner just as the button 10 throughout this disclosure.

Figure 4:
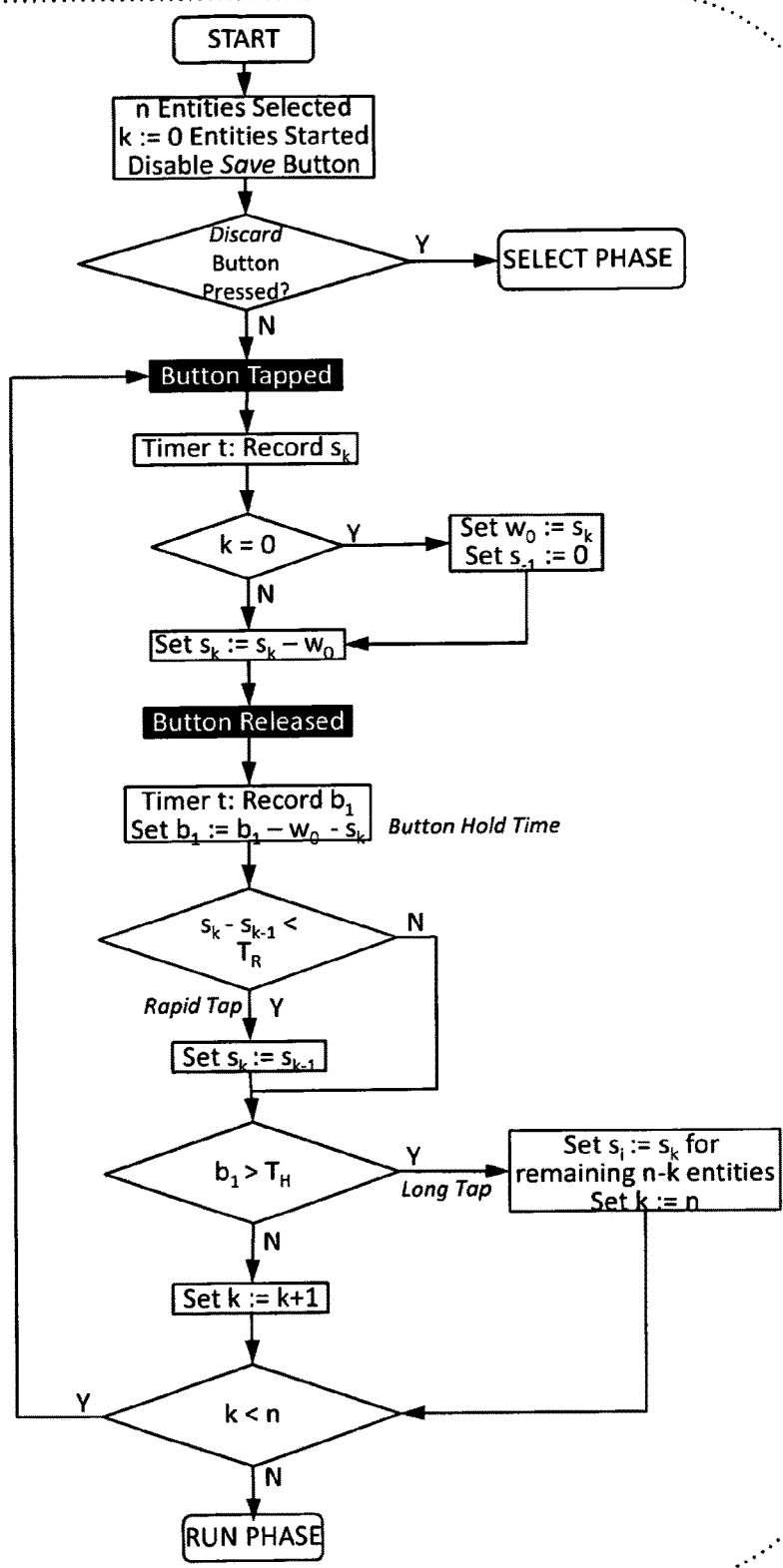
FIG. 4 is a flow chart diagram showing the start phase of the timing process.

As shown in FIG. 4, with n entities selected, k=0 started, and the save button 12 presently disabled, the operator starts the timing session and all entities 21, 22, 23, 24, 25 within this session through operating a single start button 10 that has a rest mode, in which the button is not pressed, and a tap mode, in which the button 10 is held in pressed state continuously. The button 10 is connected to a time logic unit 4 that recognizes a button press and immediately stores the current value of the timer 46 into a start time memory 43 after deducting the value of a world start time $w_0$.

The value of the world start time $w_0$ is the absolute clock time from the timer 46 that is preserved as the first action when the button 10 is pressed for the first time (k=0 in FIG. 4) in a new timing session. Deducting $w_0$, for example 10:42:32.000 (UTC), from any time preserved on tapping the button 10, for example, 10:42:47.123 (UTC) thus delivers the interval time (15,123 milliseconds for the example) since the start of the timing session, the first start time 14. This applies both to start time values $s_k$ and button hold time $b_1$.

When the button 10 is released, the time logic unit 4 stores the actuation time, that is the time elapsed since the last time value that was stored into start time memory 43, into a time register 45, thus recognizing the length of time that the button 10 was held in the tapped position by the operator. The timekeeping device 1 relies on a fixed time interval $T_H$, that the operator can adjust. Hold time $T_R$ is called button long-press hold time. $T_H$ is also called hold time. A customary value for the hold time $T_H$ is 1.2 seconds. If on release of the button 10, the value of the button hold time $b_1$ is greater than or equal to $T_R$, then the tap on the button is considered a long tap, otherwise a short tap or just tap.

In addition to $T_H$, the operator can adjust a register and pre-defined value $T_R$. $T_R$ is called rapid actuation time or, for the embodiment detailed here, rapid tap time. $T_R$ defines the minimum amount of time to elapse between multiple actuations for the timekeeping device 1 to recognize these indications as separate start events. A customary value for $T_R$ is 1.2 seconds. The application of rapid actuation time $T_R$ will become more apparent in the following.

As indicated in FIG. 4, if there are n entities 21, 22, 23, 24, 25 presently selected for the current timing session, the timekeeping device 1 remains in the start phase 71 as long as the number of started entities k is less than n. Any configuration, in which the n entities start into an activity or process, can be indicated by the operator and recorded by the timekeeping device 1 as follows:

a. If a single entity 21, 22, 23, 24, 25 starts, the operator taps the button 10 a single time and releases it before hold time $T_H$ is reached (short tap).

b. If m<=n entities start together, the operator short-taps the button 10 once, say, at time point $s_i$, and then taps it m−1 further times $s_{i+1}, \ldots, s_{i+m-1}$, each tap $s_p$ less than the rapid tap time $T_R$ after the previous tap at time point $s_{p-1}$. A short tap within rapid tap time $T_R$ of a prior tap during start phase 71 thus indicates to the timekeeping device 1 that a new entity has started, yet not at the present time, but at the point in time of the start of the previous entity (rapid multiple short tap).

c. If m<n entities have already started, and all the remaining entities start at the same time, the operator may tap the button 10 with the start of these entities and hold the button 10 for at least the hold time $T_H$, that is to say a long tap. The effect of this is that (n−m) start time records are created with one and the same, current start time. The long tap is equivalent and thus just a convenience shortcut for the procedure outlined in option b, applied to all remaining, not yet started entities. Analogously to option b, a long tap that follows within $T_R$ of any previous tap, also assumes the start time of the previously recorded start time. Thus, in a sequence of taps $s_1, s_2, \ldots, s_m$, where all the $s_i$ follow within rapid tap time $T_R$ of the previous tap and $s_m$ is a long tap, start times identical to that related to $s_1$ would be recorded for all entities not started before $s_1$.

d. If all entities 21, 22, 23, 24, 25 start together, option c applies as well, enabling the operator to long-tap the button 10 just once to start all entities 21, 22, 23, 24, 25.

As explained before, several different tapping kinds, a rapid tap as a first kind, a short tap as a second kind and a long tap as a third kind, are disclosed for the start phase 71 in order to enable the time recording for different starting situations. Manual actuation kind is a generalized notion for tapping kind.

At the end of start phase 71, the timekeeping device 1 has preserved all n individual start times 15 in the start time memory 43. Notice that the timekeeping device 1 cannot recognize entities starting at separate points in time that, however, are less than the rapid tap time $T_R$ apart. This is unlike in run phase 72, where there is no such restriction.

At this point, the operator has indicated the general start configuration of all n selected entities 21, 22, 23, 24, 25. However, the operator has not indicated, which entity relates to which start time record and thus, which individual start position. This is what the timekeeping device's central reorder logic 5 together with its principle way of displaying time records are for. Run phase 72 is automatically entered with the first subsequent time 16 recorded after the individual start times 14 for all n specified entities 21, 22, 23, 24, 25 have already been recorded.

Figure 5:
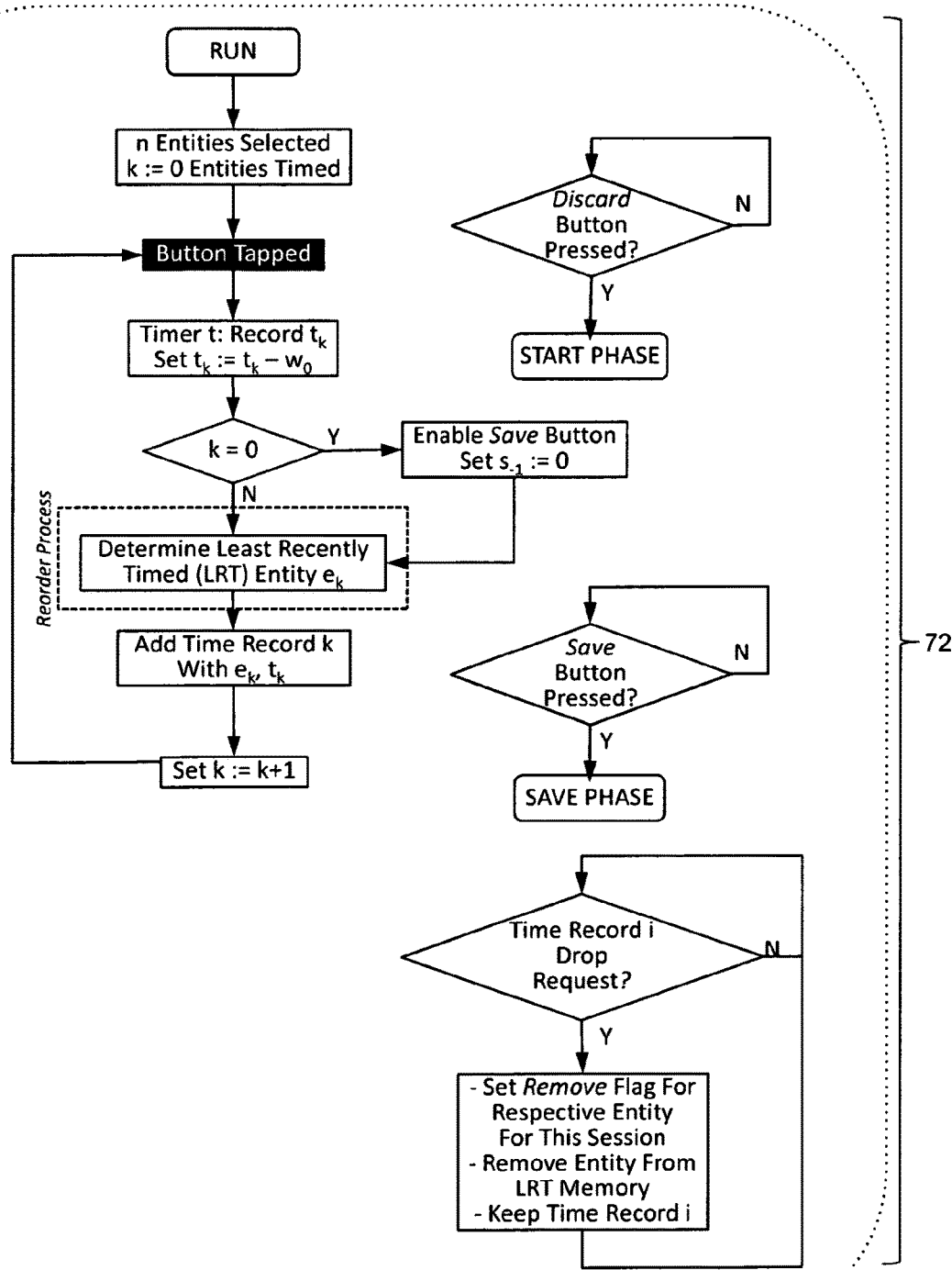
FIG. 5 is a flow chart diagram showing the run phase of the timing process.

As shown in FIG. 5, in run phase 72 the operator indicates entities 21, 22, 23, 24, 25 reaching a subsequent time 16, which is a certain split time 17 or final time 18, once all n selected entities 21, 22, 23, 24, 25 have started. Whenever the button 10 is tapped for the kth time, a time record $t_k$ is created and preserved in time memory 44, with the time being adjusted through an offset, the world start time $w_0$, in the same way as outlined for start phase 71. With the first time record after start phase 71 being recorded, also the save button 12 is enabled. Just starting one or more entities is not considered a completed timing session worth preserving by the timekeeping device 1.

Concurrently to run phase 72, in the same way as in start phase 71, a discard operation ends the currently running timing session and resets the timekeeping device 1 to an initial start phase 71. Saving the running timing session extracts a single-entity time series 730 with a world start time $w_0$ adapted to an individual start time 15 for every entity that has at least one time record for a subsequent time 16.

Notice that the process outlined in FIG. 5 does not include a means to stop the timekeeping device 1 or a particular entity's timing session. This is because, like the central timer 46 never stops, as it underlies the world clock and is just being hooked into by the timekeeping device 1, a timing session is never explicitly ended. Instead, the save or discard operation implicitly ends the timing session. In the case of the save operation, the last subsequent time 16 taken for an entity 21, 22, 23, 24, 25, if any, serves as this entity's individual final stop time 18.

Whenever a time record $t_k$ is recorded in run phase 72, or a start record $s_i$ in start phase 71, the entity 21, 22, 23, 24, 25 to which this subsequent time 16 or start time 15 respectively relates to is not immediately uniquely defined. There are two fundamental mechanisms that are central to the present disclosure to handle the assignment of entities 21, 22, 23, 24, 25 to time records:

1. A default entity 21, 22, 23, 24, 25 is always assigned to each individual time record as soon as the operator indicates a start or split event.
2. The operator can manually change the currently assigned entity 21, 22, 23, 24, 25 through the timekeeping device's display and input unit 3 by one of two principle ways (reorder modes), only one of which a particular implementation of a timekeeping device 1 according to the present disclosure must support:
   a. The operator indicates a second entity 22 different from the currently assigned first entity 21 by selecting the time record in question and choosing a different entity 22 through some sort of entity selection dialog (SET mode).
   b. The operator selects an entity 21, 22, 23, 24, 25 through its currently assigned time record within the user interface - - - time record and entity are assumed to be represented as a visual unit within the timekeeping device's interface - - - and moves the entity to a different position, thereby not moving the permanently fixed time record, but just the entity 21, 22, 23, 24, 25 (MOVE mode).

In a reorder process, the reorder logic unit 5 determines the expected entity 21, 22, 23, 24, 25 for a given time record. This procedure deals both with individual start times 15 and individual subsequent times 16 and their entities 21, 22, 23, 24, 25 to be assigned. Furthermore, the reorder logic unit 5 deals both with (a) the assignment of an entity 21, 22, 23, 24, 25 to a time or start time record just being created after pressing the button 10 as well as (b) the reassignment of one or more entities 21, 22, 23, 24, 25 to time records once the operator has manually indicated the correct assignment of an entity 21, 22, 23, 24, 25 to a time record, one entity at a time. Notice in particular, that assigning an entity 21, 22, 23, 24, 25 to another time record is likely to affect at least all following time records' expected entities.

For start time records, a first embodiment of the reorder logic utilizes the linear order of entities that derives from the full, ordered list of presently defined entities to assign an expected entity to each time record automatically. For time records in run phase 72, as shown in FIG. 5, a timekeeping device 1 according to the present disclosure relies on the least recently-timed (LRT) method: In LRT, the entity 21, 22, 23, 24, 25, whose last time record lies furthest in the past within the present timing session, gets assigned to the upcoming time record. The LRT method comes naturally close to an assignment that an operator may expect in many naturally occurring application scenarios like athletes competing against each other and overtaking each other in the process from time to time. When one athlete passes another one, LRT requires the operator to re-assign just a single entity. The reorder unit 5 can then automatically adapt entity assignments of surrounding time records by preserving the natural LRT-sequence with the exception of time records with manually assigned records.

For both start and runtime records, a second embodiment of the reorder logic 5 further uses historical information of previous timing sessions. This second embodiment of the reorder logic 5 improves on or partially replaces the previously described first embodiment of the reorder logic 5 to determine automatically the expected entity to assign to newly created time records 15, 16. The reorder logic 5 also supports the reassignment of entities to further time records, which might be needed, when the user has manually reassigned an entity to a new time record. For the automatic assignment and reassignment of an entity A to a recorded time 15, 16, the second embodiment of the reorder logic 5 in particular relies on statistical methods such as maximum likelihood and Bayesian inference to derive the most likely entity assignment. For example, if in several prior timing sessions, where a first and an second entity A and B started in a joined timing session, and the first entity A always started before the second entity B, then it is reasonable to assume that in a new timing session including just the first entity A and the second entity B, where the timekeeper indicates two separate start times, the reorder logic 5 expects the first entity A to be the one to start first again. Analogously, given enough prior information, the reorder logic 5 can make predictions as detailed as, for example, a certain entity most likely passing another entity right after the third split time.

Furthermore, to enhance statistical methods to predict the correct assignment of entities to time records, the reorder logic can rely on additional, contextual information that can be part of an extended time series memory 50. Contextual information can in particular include the time of day and year, as well as the physical location at which a timing session is being recorded.

Contextual information as well as historical timing information used to improve predictions by the reorder logic 5 can further rely on data gathered by multiple different timekeepers through different timing devices and be accessed cross-device through a shared cloud storage unit 53.

Finally, in a further embodiment, the prediction logic can even make the selection of entities in selection mode obsolete. With enough prior information, the reorder logic 5 can reasonably predict that a timing of two entities on a Monday morning at 6 am in close proximity of a certain training center will be the specific entities A and B. A large enough history of entities' typical start patterns can even make the indication obsolete of how many entities will start next. For example, if the minimum first split time that a timekeeper has recorded in a large enough timing history, is at 10 seconds after the start, then the recording of three first times in a timing session of 0.0, 2.0 and 3.8 seconds suggests that there are three entities being started.

Instead of automatically assigning entities to time records according to the used statistical method, the timekeeping device may also just highlight discrepancies between the expected assignment of entities calculated by the statistical method and the actual, manual assignment by the operator: For example, highlighting an entity that the user has just manually reassigned in a specific approval color on the touch screen to indicate that the reorder logic 5 agrees with the manual reassignment. And highlighting a manually reassigned entity in a different objection color on the touch screen to indicate that the reorder logic 5 does not agree with the manual reassignment. Both times, the reorder logic 5 decides based on calculations performed by use of a chosen statistical method.

To proactively support the timekeeper in not missing an entity's split time, the reorder logic 5 also enables the display of the entity, whose start or split time is expected to be taken next. This prediction, too, is based on predictive methods described previously, such as default start order, Least-Recently-Timed (LRT) or more advanced statistical methods.

The reorder unit 5 may allow reassignment of entities 21, 22, 23, 24, 25 to any time records at any time while adapting other entity assignments to the most likely scenario every time. However, the present disclosure in particular includes the restricted case where start time records can only be reordered as long as there are no further, i.e., run time, records present. In other words, the first subsequent time 16 recorded for any entity 21, 22, 23, 24, 25 fixes the sequence of start time records, which then become the natural basis for the LRT method's further default ordering of time records. Furthermore, the present disclosure in particular includes another optional restriction in allowing entity reassignments only amongst the last time records recorded for every entity 21, 22, 23, 24, 25. In other words, with the taking of the next time record for an entity 21, 22, 23, 24, 25, the operator acknowledges the prior time record of this entity as correctly assigned.

Figure 7:
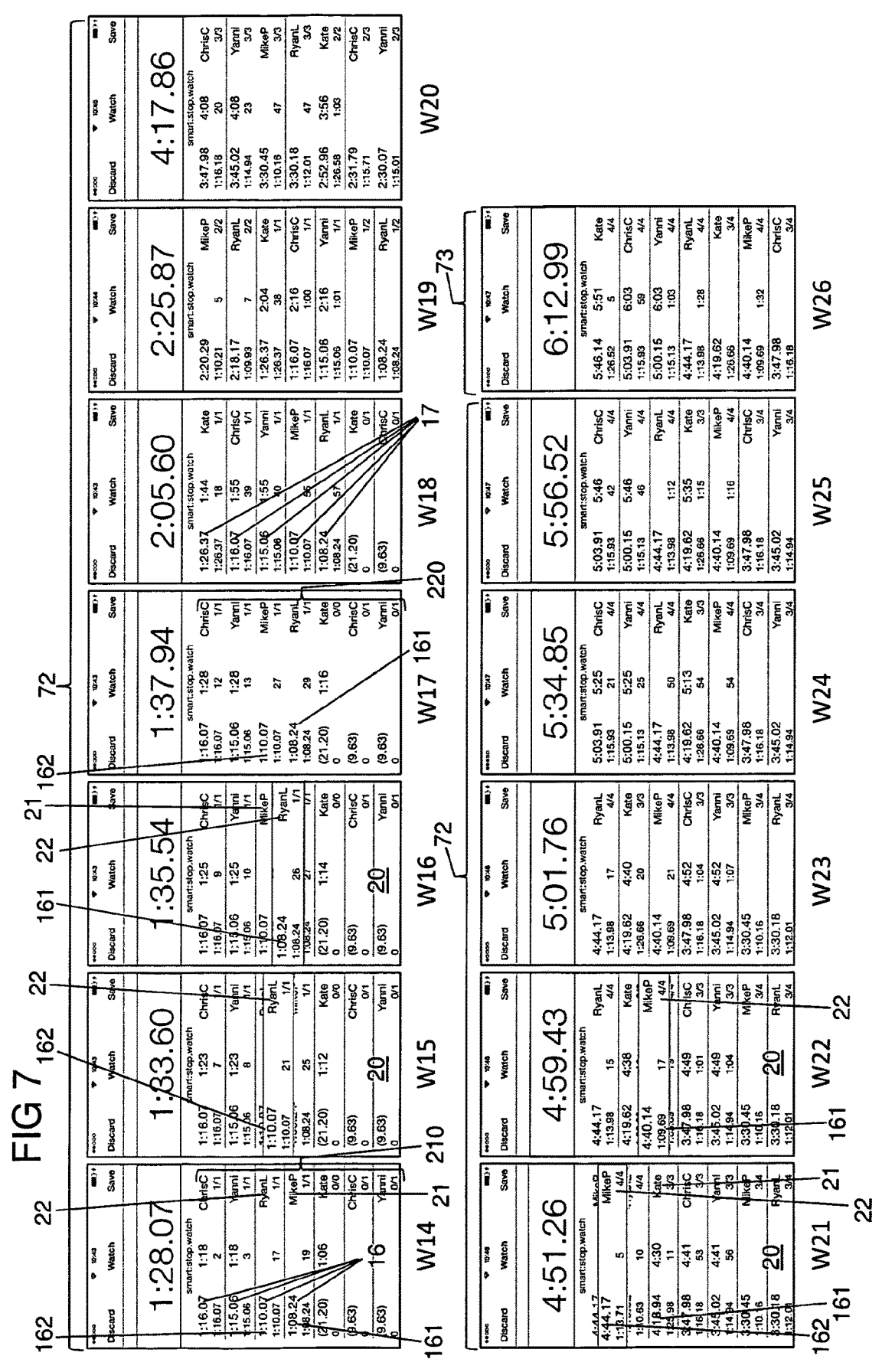

The display and input unit 3 may have a mechanism to scroll, in particular (a) by means of further buttons or, as shown in FIG. 7. for the presented embodiment, (b) through a touch screen, in multiple rows displayed fully, partially, or individually on the display.

A row on the display can in particular show the current individual split time, the current lap time, the current total runtime, the current lap time, identifying information of the entity 21, 22, 23, 24, 25 such as a short ID, and the record number in the overall sequence of time records, where all these information are specific to the entity and its relative individual start time 15, as the entity is currently assigned to the time record displayed in this row.

In more detail, a display unit related to the present disclosure can in particular support the concurrent showing of and scrolling within multiple time records, where information displayed for each time record includes in particular:

1. An identifier for the entity (entity ID) presently assigned to the time record.
2. The sequence number and total number of current time records, excluding the start time record, of this time record with respect to the entity that is presently assigned to it. The start time record in particular may carry a sequence number of 0 (zero).
3. The (fixed) time elapsed since the start of the currently assigned entity (individual split time).
4. The (fixed) time elapsed since the most recent time recorded for the presently assigned entity prior to this time record (lap time).
5. For the last recorded time record for each entity, the ongoing, constantly changing time elapsed since the start of this entity, in particular if, and only if, the individual start time 15 of this entity is not 0. In the latter case the current, overall session runtime, presumably also displayed separately, is identical to the time otherwise displayed here (current individual split time or runtime).
6. For the last recorded time record for each entity, the ongoing, constantly changing time elapsed since the last recorded time for this entity (current lap time).

The timekeeping device 1 of this disclosure in particular updates any of the above information in real time, when an entity assignment changes or is in the process of being changed, exemplified by moving a time record-related entity to a new position. When moving the frame of a time record to indicate the reassignment of its presently assigned entity, the moving frame's representation on the display is adapted, so that all times, including in particular the current, entity-specific split- and lap-time, are updated in real time as if the entity was dropped at the current position (see, for example, the embodiment shown in FIG. 6, W10-W12, or FIG. 7, W21-W22). The same applies to other time records, whose presently expected entities may be adapted through a real-time reorder process on the fly.

Figure 8:
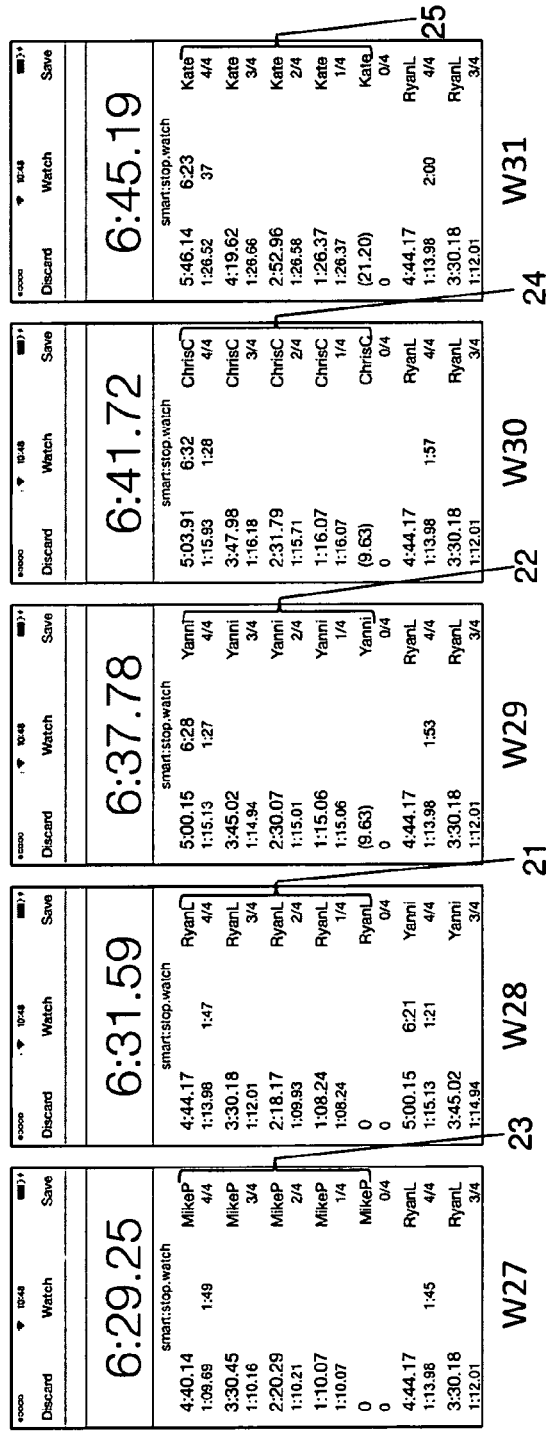
FIG. 8 shows a third sequence of the display unit with the time records ordered by a chosen entity.

In addition, FIG. 8, shows time records grouped by entity, as reached by briefly tapping on any entity's time record on the right side. A tap on the left side of any time record returns the timekeeping device 1 into showing all time records in reverse sequential order with respect to their recorded time, irrespective of entities assigned.

In the following description of possible use case scenarios, the notions timekeeping device and stopwatch or watch are used synonymously. Consider swimmers that exercise in a swimming pool as a training group. A typical scenario has five swimmers 21, 22, 23, 24, 25, identified by the letters A to E in the following, on two lanes swim a timed 400 meters freestyle together - - - with 100-meter split times and total time being important to measure by the single coach. As the two lanes allow at most two swimmers to start together, typically two groups of two swimmers followed by the single remaining swimmer will start with a certain break in between, say roughly, but hardly exactly, ten seconds. In this situation, there is no outside input or prior specification of fixed individual start times 15 by any means or devices.

The actual start configuration may thus be: Swimmers A and B starting at their individual start time 15, which is 0.0 with respect to the overall timing session, followed by C and D at around 9.5 seconds actually, followed by E at around 21 seconds total elapsed time. Swimmer A swims a constant 1:10 minutes split, swimmer B starts with a 1:08 and loses 2 seconds on his 100-meter lap time each following 100 meters and swimmers C, D and E swim a constant 1:15, 1:16 and 1:26.5 respectively. Start and lap times are simplified to make it easier to follow the example. There would be no added complexity for the timekeeper, if more realistic variations of times occurred in a real-world scenario.

Table 1 presents all relevant information that are preserved in time records consisting of a time interval since start of the timing session and the presently assigned entity. Table 1 also shows the time interval adjusted by the presently assigned entity's start time. This is the time shown to the timekeeper. Time points T1 through T3 represent the five individual start times, time point T14 represents a common split time for swimmers A and B, and all remaining time points represent split and final times for an individual swimmer for a total of 5×5=25 underlying time points and their associated time records to be taken for all individual start times 15, individual split times 17 and individual final stop times 18 for all swimmers. Session time indicates the elapsed time from the beginning of the entire timing session, from when the first swimmer starts, to its end, when the last swimmer completes the total distance.

TABLE 1

Example timing scenario: Five swimmers on two lanes swimming a 400 m freestyle, times kept every 100 m. Showing reference sign (#), session time (i.e., time since first start at world start time $w_0$), times relative to respective swimmers, and short event description (events).

| # | Session time | A | B | C | D | E | Events |
|---|---|---|---|---|---|---|---|
| T1 | 0:00.0 | 0:00.0 | 0:00.0 | | | | Start of swimmers A, B |
| T2 | 0:09.5 | | | 0:00.0 | 0:00.0 | | Start of swimmers C, D |
| T3 | 0:21.0 | | | | | 0:00.0 | Start of swimmer E |
| T4 | 1:08.0 | | 1:08.0 | | | | Swimmer B, 100 m split |
| T5 | 1:10.0 | 1:10.0 | | | | | Swimmer A, 100 m split |
| T6 | 1:24.5 | | | 1:15.0 | | | Swimmer C, 100 m split |
| T7 | 1:25.5 | | | | 1:16.0 | | Swimmer D, 100 m split |
| T8 | 1:47.5 | | | | | 1:26.5 | Swimmer E, 100 m split |
| T9 | 2:18.0 | | 2:18.0 | | | | B, 200 m |
| T10 | 2:20.0 | 2:20.0 | | | | | A, 200 m |
| T11 | 2:39.5 | | | 2:30.0 | | | C, 200 m |
| T12 | 2:41.5 | | | | 2:32.0 | | D, 200 m |
| T13 | 3:14 | | | | | 2:53.0 | E, 200 m |
| T14 | 3:30.0 | 3:30.0 | 3:30.0 | | | | A, B, 300 m |
| T15 | 3:54.5 | | | 3:45.0 | | | C, 300 m |

TABLE 1-continued

Example timing scenario: Five swimmers on two lanes swimming a 400 m freestyle, times kept every 100 m. Showing reference sign (#), session time (i.e., time since first start at world start time w₀), times relative to respective swimmers, and short event description (events).

| # | Session time | A | B | C | D | E | Events |
|---|---|---|---|---|---|---|---|
| T16 | 3:57.5 | | | | 3:48.0 | | D, 300 m |
| T17 | 4:40.0 | 4:40.0 | | | | | A, 400 m (finish) |
| T18 | 4:40.5 | | | | | 4:19.5 | E, 300 m |
| T19 | 4:44.0 | | 4:44.0 | | | | B, 400 m (finish) |
| T20 | 5:09.5 | | | 5:00.0 | | | C, 400 m (finish) |
| T21 | 5:13.5 | | | | 5:04.0 | | D, 400 m (finish) |
| T22 | 6:07.0 | | | | | 5:46.0 | E, 400 m (finish) |

To address a real-world scenario such as in the given example, an operator (a swim coach) today either uses one stopwatch, starts this with the first starting entity (swimmer A or B in the example above) and keeps individual split times for each entity on that same device while estimating adjusted individual split times in their head. Or, operators use multiple stopwatches, each device either for an individual entity or a group of entities with common start time (one watch each for swimmers A and B, one for C and D, and one for E in the example), then struggling to keep track of the particular stopwatch to operate with each relevant split event approaching. In both scenarios, a skilled operator can sensibly keep track of at most a very few entities at the same time, usually no more than two or three. Operators often use pen and paper to note down individual split times and require entities to start in set time intervals, e.g., with exactly 10 seconds in between separate starts. The latter, of course, is of no use in scenarios where the start times of entities cannot be controlled exactly, as is the case in most real-world situations of athletes training.

In the example shown in Table 1, a swim coach with a single watch would have to start the watch with swimmers A and B and mentally note down the exact delay at which swimmers B, C and D started. To come up with individual split times 17 at time points such as T17, T18 and T19, for example, the coach would have to recognize that time points T17 and T19 belong to swimmers A and B, which started with the overall start of the stopwatch, yet time point T18 relates to swimmer E, which started about 20 seconds late. With swimmer A having passed swimmer B right before time point T17, even if the coach were to take all individual split times 17, it would be virtually impossible for her to later identify, which time would likely relate to which swimmer 21, 22, 23, 24, 25 and would thus require start time adjustment.

If the coach where to use multiple stopwatches, say, one for every one of the three starting groups, she would then struggle to select the right watch, a challenge in particular at time points T17, T18 and T19, where the switch between stopwatch one and three, and back again, would have to happen within four seconds. The same obviously applies, when a single timekeeping device contains multiple timers with buttons at different physical locations on the device, or a mechanism to switch between different timers. Notice in particular, that manual timekeeping almost always requires visual confirmation that an entity 21, 22, 23, 24, 25 has reached a point where an individual split time 17 has to be taken. Therefore, it is imperative for a device operator not to having to focus on visually finding the right button to push with a finger when an entity reaches an individual split time point.

Finally, notice the configuration overhead and complexity that a stopwatch operator, even when able to handle multiple devices in the manner outlined above, has to endure. The number of stopwatches or the number of timers within a state-of-the-art multi-stopwatch can differ from one timing to another, and so can the number of entities to be assigned to every watch or timer.

So, the central question for a timekeeping device 1 disclosed herein that can capture all of the scenarios and complexities outlined above is: How can a single operator communicate to a stopwatch a. "this is when each member of a group of multiple people started into the activity" and
b. "this subsequent time 16 belongs to that entity" without having to take her eyes away from the starting entity or entities at the very moment that the entity starts or reaches a split point and, furthermore,
c. "please show me the individual split times 17 of an entity with respect to its individual start time 15".

This is what a watch 1 relying on the present disclosure handles as follows. In the example outlined in Table 1:

1. At point T1 in time, the coach would start the timing session with the first, short tap on the main button 10 for the first starting swimmer 21, followed within time $T_R$ by another short tap to indicate that another swimmer 22 started together with the former swimmer 21.

2. At point T1, the watch 1 would create a new timing session by creating a new multi time series (MTS) 720 with a world start time $w_0$ of, for example, 2015-03-14 16:32:15.122 (UTC), assuming that the first swimmer started on Mar. 14, 2015 at 32 minutes, 15 seconds and 122 milliseconds past 4 pm according to coordinated universal time (UTC). The watch 1 would add two time records with times of 0 milliseconds (ms) each.

3. Still at T1, let's assume that the coach had selected swimmers A to E from entity list memory, where she had defined them in the following default order 200: B, C, A, D, E. Then by default swimmers B and C would be assigned to new time records 1 and 2 in the current multi time series (MTS) 720 at this point (see references M1 and M2 in Table 3 showing the time records being created) with A, D, and E still outstanding in the default sequential order 200.

4. At T2 and T3, the coach would indicate the group of two following swimmers and the final starter, respectively, leading to three further time records M3, M4, M5 being created.

5. Let's assume that the coach thinks swimmer A to be the fastest and thus wants him to appear as the first starting swimmer 21. The coach would thus execute a single correction operation, moving swimmer A to the front, to handle the incorrect assignments of swimmers to start records as indicated in Table 3, leading to adjustments of M6, M7, . . . , M10. Start time records as shown in Table 2 would implicitly be corrected from their default assignment of S1, . . . , S5 to the adjusted assignments of S6 to S10. This concludes the start phase 71.

6. In run phase 72, at time point T4, B turns out to be fastest at first, resulting in an incorrect entity assignment (see reference M11 in Table 3), which requires another reordering by the operator. The incorrect automatic assignment is due to least recently timed (LRT). LRT identifies swimmer A as the entity to assign to the first split time record, as A's prior time record, a start time record in this case, lies furthest in the past amongst all entities' last time records.

7. Up to time point T17, LRT-based entity prediction would then deliver the right entity assignment without the need for the operator to intervene again. (See also references M12 to M20 for entity assignments.)

8. At time points T17, T18, and T19, default ordering would assign entities E, B, and A instead of the correct sequence of A, E, B, unknowing that A just passed direct rival B at this point as well as overtaking late-started E. To counter this, the operator moves A to E's record (see M24), with E and B being automatically re-assigned to their correct spot.

9. With the only special treatment at reference M30 left, the watch 1 is ready to extract and save individual time series 730 that are correct and specific to every entity 21, 22, 23, 24, 25.

Table 2 summarizes the start time memory in progress of the example from Table 1. Start time memory stores one time record for every one of the multiple entities. In doing so, the linear order of entities derived in the entity selection process is predicted to be the start sequence of entities, B-C-A-D-E in the example, as shown in reference rows S1 to S5 in Table 2. Recognizing swimmer A as part of the first starting swimmers and thinking A to be the fastest, the coach re-assigns entity A to the first start time record with an individual start time of 0.0 seconds at reference point S5. According to the method disclosed here, the remaining start order remains unchanged by default. So the other entities are assigned to their respective following record. This leaves a final assignment of entities A, B, C, D, E to start time records one to five.

TABLE 2

Start time memory in progress: Start time memory 43 for the example of Table 1 with changing entries due to corrections after start phase 71. Shown: Reference sign (#), related reference sign from Table 3 (M#), entity, individual start time 15 (in seconds with milliseconds precision) presently assigned. All non-absolute times in multi time series 720 are with respect to their presently assigned entity's individual start time 15, which is deducted from these times to arrive at the correct time that is then shown to the operator.

| # | M# | Entity | Individual start time |
|---|----|--------|----------------------|
| S1 | M1 | B | 0.000 |
| S2 | M2 | C | 0.000 |
| S3 | M3 | A | 9.500 |
| S4 | M4 | D | 9.500 |
| S5 | M5 | E | 21.000 |
| S6 | M6 | A | 0.000 |
| S7 | M7 | B | 0.000 |
| S8 | M8 | C | 9.500 |

TABLE 2-continued

Start time memory in progress: Start time memory 43 for the example of Table 1 with changing entries due to corrections after start phase 71. Shown: Reference sign (#), related reference sign from Table 3 (M#), entity, individual start time 15 (in seconds with milliseconds precision) presently assigned. All non-absolute times in multi time series 720 are with respect to their presently assigned entity's individual start time 15, which is deducted from these times to arrive at the correct time that is then shown to the operator.

| # | M# | Entity | Individual start time |
|---|----|--------|----------------------|
| S9 | M9 | D | 9.500 |
| S10 | M10 | E | 21.000 |

Table 3 summarizes the multi time series in progress for the previous example of Table 1: Reference M1 presents the time record ($T_R$) for the first starting swimmer with default entity assignment B. Presumably, there is no time for the coach to correct this during hectic start phase. At M2, the joined start leaves swimmer C, the next in default order, with the same start time of 0.0 seconds. M6 is the first point where the coach actively intervenes by moving A to TR 1 (and not 2, as she expects A to be fastest). With no prior information assumed, other entity assignments are implied automatically and just moved up according to LRT or, in this case, default sequential start order, as shown in the rows at reference M7 to M10, which leaves the sequence of entities to be assigned to the following split times at A-B-C-D-E according to LRT past reference M10. Times are always fixed. So, at reference M11, A is assigned instead of the correct B. After taking the next split time at M12, the coach has time to move entity B, by default assigned to this TR 7 to correct TR 6. The sequence, according to least recently timed, for the next entity assignments then is: C-D-E-B-A at M14. After just a very few manual interventions by the coach, this is the right entity sequence for all the upcoming split times and associated time records down to TR 20 at reference M21. Notice how swimmer B at TR 16 (reference M19) is still ahead of swimmer A, yet barely. However, with rapid actuation, i.e., rapid tap here, just part of start phase, the coach can easily record both swimmers' split times with two quick taps on the central button. At M21, A has finally passed B. But it is actually E's turn according to LRT and most recent TRs (and B, A following next in LRT). So, E is assigned automatically. Even with just local time series history being considered as additional context information, the watch could have caught this automatically. However, with assumption of no prior knowledge in this example and thus just LRT in place, the watch would have missed this. M22 actually relates to swimmer E then. The default assignment of B here, is also incorrect. Because of the closeness of events, the coach has no time to correct this here yet. So, M23 should relate to B. But A is assigned next. However, now the coach has a little breezing room to move A to TR 20 (in M24), which has E presently, and mark TR 20 as the last time record of A, one of the methods to prevent further consideration of A in upcoming time records in the somewhat untypical cases where entities are lapped. With E and B moved down one spot following LRT, this already gives the correct assignments of entities to TRs. So, the final split times, which then are considered the remaining entities' individual stop times, are correctly assigned automatically right away at reference points M25ff.

For reference, Table 4 shows a representation of the multi time series at the final state of the timing session. Table 5 then for each entity shows the individual time series as they are derived from the final state of the multi time series and preserved in time memory on saving the timing session.

TABLE 3

Multi time series in progress: Reference sign (#), reference sign from related row in Table 1 (T#), time record number (TR), time elapsed (in seconds with millisecond accuracy) since world start time $w_0$ and presently assigned entity 21, 22, 23, 24, 25 over time as maintained in multi time series 720 stored in time memory 44. The entity 21, 22, 23, 24, 25 is first predicted by the watch 1 and potentially re-assigned later by the coach.

| # | T# | TR | Time | Entity Assigned |
|---|----|----|------|-----------------|
| M1 | T1 | 1 | 0.000 | B |
| M2 | T1 | 2 | 0.000 | C |
| M3 | T2 | 3 | 9.500 | A |
| M4 | T2 | 4 | 9.500 | D |
| M5 | T3 | 5 | 21.000 | E |
| M6 | | 1 | 0.000 | A |
| M7 | | 2 | 0.000 | B |
| M8 | | 3 | 9.500 | C |
| M9 | | 4 | 9.500 | D |
| M10 | | 5 | 21.000 | E |
| M11 | T4 | 6 | 68.000 | A |
| M12 | T5 | 7 | 70.000 | B |
| M13 | | 6 | 68.000 | B |
| M14 | | 7 | 70.000 | A |
| M15 | T6 | 8 | 84.500 | C |
| M16 | T7 | 9 | 85.500 | D |
| M17 | T8 | 10 | 107.500 | E |
| M18 | T9 | 11 | 138.000 | B |
| ... | | | | |
| M19 | T14 | 16 | 210.001 | B |
| M20 | T14 | 17 | 210.089 | A |
| ... | | | | |
| M21 | T17 | 20 | 280.000 | E |
| M22 | T18 | 21 | 280.500 | B |
| M23 | T19 | 22 | 284.000 | A |
| M24 | | 20 | 280.000 | A |
| M25 | | 21 | 280.500 | E |
| M26 | | 22 | 284.000 | B |
| M28 | T20 | 23 | 309.500 | C |
| M29 | T21 | 24 | 313.500 | D |
| M30 | T22 | 25 | 341.000 | E |

TABLE 4

Multi time series 720 in the final state of the example presented in Table 1: The multi time series 720 is just the in-memory combination of a world start time $w_0$ as clock time and all time records with start time records specially marked. Each time record consists of a number representing the time elapsed since start of the timing session, which is at $w_0$, in milliseconds (shown as seconds with milliseconds precision here). Entity-specific times as they are relevant in real-time as well as post-timing session can then be derived for every time record by subtracting the currently assigned entity's start time from the given record's time.

World Start Time 2015-03-14 16:32:15.122

| Time Record (TR) | Time Since Session Start | Entity Assigned | Is Start Record? |
|---|---|---|---|
| 1 | 0.000 | A | X |
| 2 | 0.000 | B | X |
| 3 | 9.500 | C | X |
| 4 | 9.500 | D | X |
| 5 | 21.000 | E | X |
| 6 | 68.000 | B | |
| 7 | 70.000 | A | |
| 8 | 84.500 | C | |
| 9 | 85.500 | D | |
| 10 | 107.500 | E | |
| 11 | 138.000 | B | |
| ... | | | |
| 16 | 210.001 | B | |
| 17 | 210.089 | A | |
| ... | | | |
| 20 | 280.000 | A | |
| 21 | 280.500 | E | |
| 22 | 284.000 | B | |
| 23 | 309.500 | C | |
| 24 | 313.500 | D | |
| 25 | 341.000 | E | |

TABLE 5

Individual time series 730 derived from the multi time series 720 of Table 4: Derived and stored into time series memory 44 when saving the timing session and its underlying multi time series 720 are entity-specific individual time series 730 with adapted, entity-specific world start time (in UTC), calculated by adding the entities' individual start time 15 to the world start time $w_0$ of 2015-03-14 16:32:15.122 (UTC). Shown: Reference sign (#), entity 21, 22, 23, 24, 25 (entity e), entity-specific individual world start time ($w_0(e)$), the individual time sequence (in seconds with milliseconds accuracy), and start time with respect to $w_0$ (comment).

| # | Entity e | $w_0(e)$ | Time Sequence | Comment |
|---|----------|----------|---------------|---------|
| I1 | A | 2015-03-14 16:32:15.122 | 70.000, 140.000, 210.000, 280.000 | $w_0$ + 0.000 |
| I2 | B | 2015-03-14 16:32:15.122 | 68.000, 138.000, 210.000, 284.000 | $w_0$ + 0.000 |
| I3 | C | 2015-03-14 16:32:24.622 | 75.000, 150.000, 225.000, 300.000 | $w_0$ + 9.500 |
| I4 | D | 2015-03-14 16:32:24.622 | 76.000, 152.000, 229.000, 304.000 | $w_0$ + 9.500 |
| I5 | E | 2015-03-14 16:32:36.122 | 86.500, 173.000, 259.500, 346.000 | $w_0$ + 21.000 |

Figure 6:
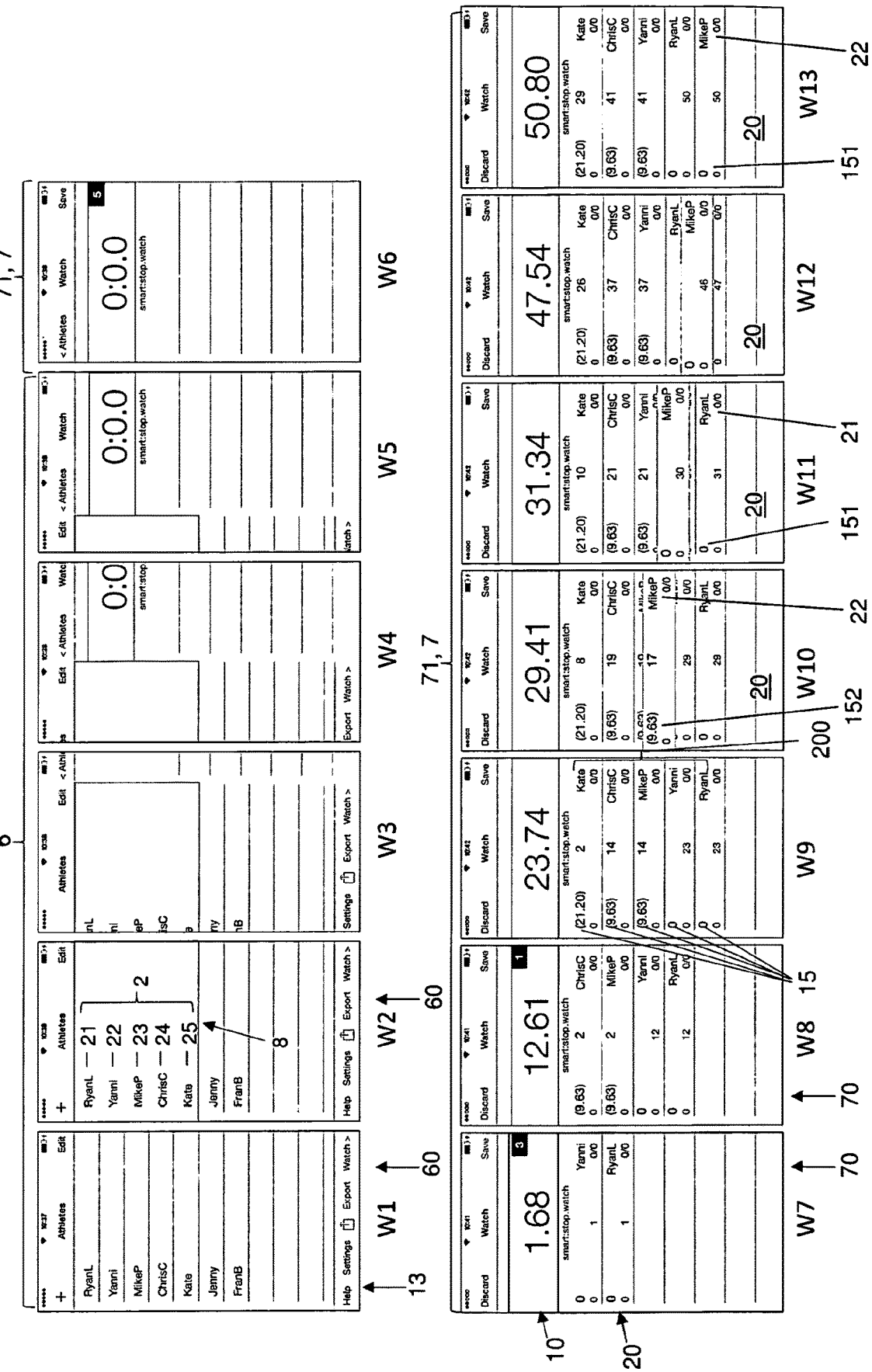
FIG. 6 shows a first sequence of the display unit during select and reassignment process.

For an embodiment, which uses a touch screen to represent all buttons and time records and MOVE reorder method for reassigning entities 21, 22, 23, 24, 25 to time records, FIGS. 6 and 7 show the full select-start-run process by means of an example in which swimmers A to E carry the following entity IDs (in default list order 200):

B—RyanL
C—Yanni
A—MikeP
D—ChrisC
E—Kate

Times are comparable to the more simplified time values from Table 1. FIG. 6 shows steps W1-W13. FIG. 7 shows steps W14-W26.

With entities RyanL to FranB in entity list memory 40 (FIG. 6, W1), the operator selects entities RyanL to Kate (W2) and swipes from select mode 6 to timing mode 7 (W3-W5). The watch is reset and pre-configured to five expected entities 21, 22, 23, 24, 25 yet to be started (W6, indicator near top right). The current, running session time is always shown on top within the area that represents the first actuator 10.

Starting all five entities 21, 22, 23, 24, 25 with five short taps, where tap 2 and tap 4 follow within rapid tap time $T_R$ of the preceding tap, leaves an initial entity assignment of RyanL, Yanni, MikeP, ChrisC, and Kate (W7-W9), represented in the watch 1 with the most recent time record on top. Moving entity MikeP (equivalent to swimmer A) to the front spot (at the bottom) by long-tapping its currently assigned record, pulling it down, and releasing it (W10-13), sees the watch 1 update record times and entity assignments on the fly until the final position is reached. Notice that, although it seems as if an entire time record where moved, it is just the entity that is moved, while the start time of the record that the entity is moved to remains the same and the assignments of surrounding time records adapt.

Every start time record at this point shows either "0" or a late individual start time 15 in brackets (e.g., "(21.20)" for Kate) at the top left position, while in the center, the current, running individual split time with respect to the entity's actual individual start time 15 is shown. In run phase 72 (see FIG. 7, W14*ff.*), the six distinct fields for every time record then show, for example, for ChrisC in W20:

1. The individual split time 17 (top left): 3:47.98
2. The lap time (bottom left): 1:16.18
3. The running, overall time for this entity, updated in real time, if this differs from the session time shown on top of the watch (top center): 4:08 (ChrisC started 9.63 seconds after the beginning of the session, the current session time is 4:17.86, so ChrisC's overall time so far is 4:17.86 minus 9.63 equals around 4:08)
   a. MikeP's time records, for example, never have this field, because MikeP started with the session start.
4. The entity-specific, running, real-time lap time (bottom center): 20 [seconds]
5. The entity ID (top right): ChrisC
6. The entity's record number in the time-ordered sequence of individual split times 17 available (disregarding the start time record, which always receives record number 0) and overall total number of individual split times recorded (bottom right): 3/3

References W15, W16 and W21, W22 in FIG. 7 depict the other two manual re-orderings equivalent to steps T4 and T17 in the example of Table 1. Reference point W26 then shows the final state of the example run for the given embodiment, with references W27 to W31 showing just alternative views with different orderings of the times recorded. That is, there is the default view on all start and split time records, sequentially ordered by the time they were taken from newer records to older records. In addition, there is another mode to present the time records, grouped by the entities that they are currently associated with, where the order within each such group remains sequential in the same way as in the default view. The alternative, grouped view mode comes handy for the timekeeper to inspect each entity's individual progress and final result. For the embodiment of a touch screen detailed here, the default order is applied whenever the operator (a) taps in the left third of any time record or (b) taps the main time button. The alternative, group-ordered view is activated by taping the right third of any time record, the presently assigned entity of which is then shown as the top-most group.

Notice that the overall session timer shown within the main actuator keeps running (in the example, from 6:12.99 in FIG. 7, W26, to 6:45.19 in FIG. 8, W31). This is because there is no "stop" button of a traditional stopwatch. When the timekeeper decides to preserve all recorded time series and thus taps the save actuator, the watch automatically recognizes each entity's last split time recorded as the final individual stop time.

Figure 9:
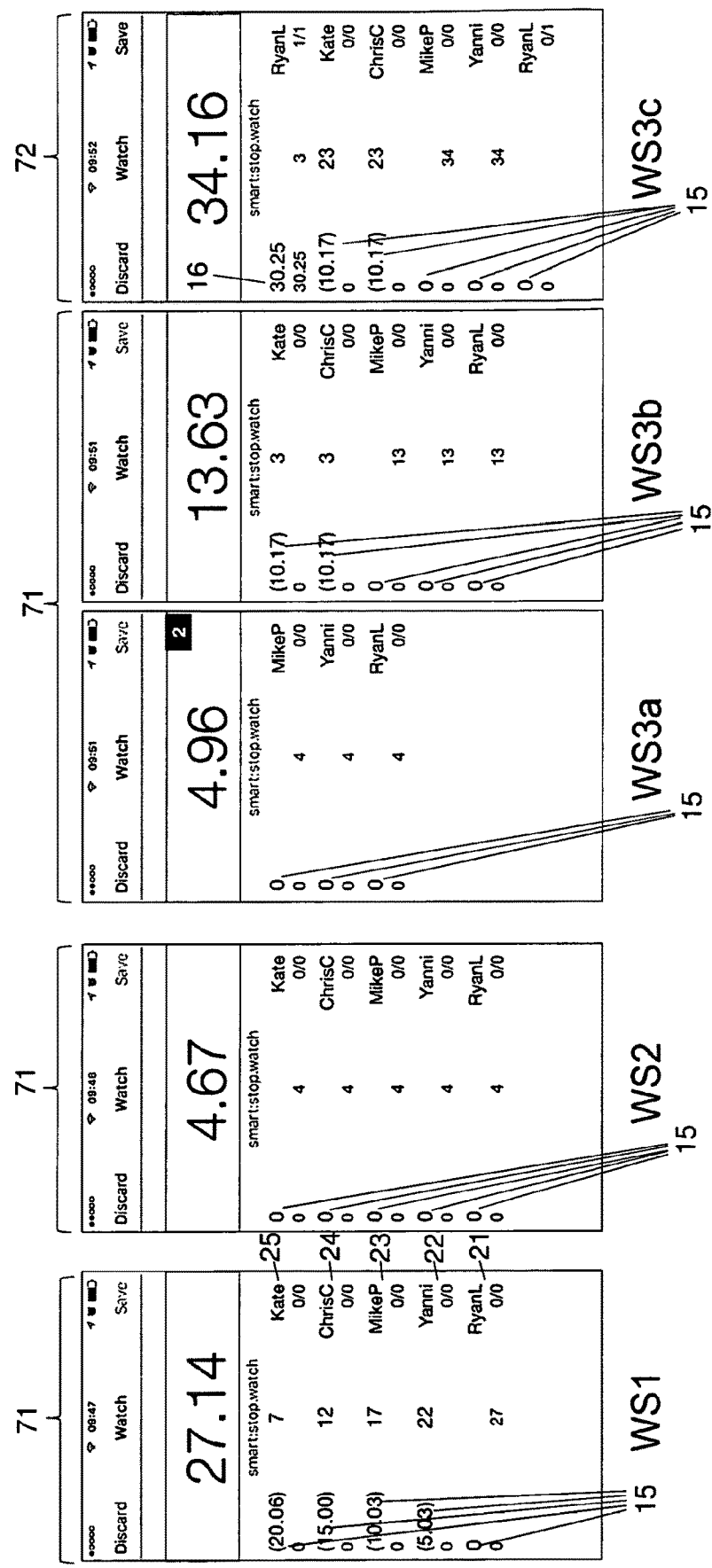
FIG. 9 shows examples of a first, a second and a third kind of manual actuation.

In addition to the full walk-through of a timing session as presented in FIGS. 6 to 8, FIG. 9 shows further, representative examples for the different actuations in start phase. FIG. 9 refers to a touch screen device. FIG. 6, references W7-W13, showed a 2-2-1 start configuration: Two groups of two athletes, followed by one group with just one athlete started into the activity. On the exemplary embodiment of a touch screen device, this translates to a short tap, rapidly (e.g., within 1.2 seconds) followed by another short tap for the first start group (rapid tap as the embodiment of rapid actuation on a touch screen device). The same sequence of operations again for the second start group and later, a single tap for the final athlete.

For the same set of entities as in FIGS. 6 to 8, FIG. 9, reference WS1, shows the effect of five individual short taps about five seconds apart, which is well above a typical rapid tap time of 1.2 seconds. Each tap thus communicates an independent start by one entity, in this example, relying on default order derived from the list that the entities where selected from in selection phase. Thus, reference WS1 is an example of a second kind of actuation of the first actuator.

Reference WS2 in FIG. 9 demonstrates a single long tap as the embodiment of a third-kind actuation of the first actuator. The effect of the single long tap here is the recording of a single time point with the touch-down of the finger on the respective touch-sensitive area. This time point is then assigned to as many start time records as there are entities presently selected, which is five entities in this case.

References WS3*a* to WS3*c* in FIG. 9, finally, presents another more complex start scenario, in which a group of three athletes (see WS3*a*) start together, which is indicated by an initial short tap followed within rapid tap time by another such tap and again within rapid tap time yet another short tap. Notice that the three taps do not have to happen all within the rapid actuation time of, for example, 1.2 seconds, but can each be spread, for example, a much more convenient 1 second apart. The first group of three athletes is followed by a second group of the remaining two athletes (see WS3*b*). There are two equivalent ways for the timekeeper to indicate the joined start of these final two athletes to the stopwatch:

1. The timekeeper can short tap once, followed by another short tap within rapid tap time.
2. The timekeeper can just long tap once.
3. In a third way, the timekeeper can short tap once, followed by a long tap within rapid tap time of the short tap, like in the earlier example, indicating to the watch to start all remaining entities. As there is only one athlete left, however, the effect of such long tap does not differ from a short tap in this case.

References WS3a and WS3b give two examples of a first kind of actuation of the first actuator.

WS3c in FIG. 9, emphasizes again the end of start phase, which happens right when the watch operator taps the main timing button for the first time right after start times have been recorded for all presently selected entities. In this case, this leaves a first split time record with athlete RyanL assigned, as he is the least recently timed entity in this example.

The invention claimed is:

1. A method for simultaneously timing multiple entities using a timekeeping device comprising a first actuator and a time measuring means, wherein during timing each of the multiple entities runs through a process starting with a start time event in a start phase followed by at least one subsequent time event in a run phase, the method comprising:
   in the start phase, when a first start time event occurs, the first actuator is manually actuated and the manual actuation triggers the measuring and recording of a first start time by the time measuring means,
   in the run phase following the start phase, when a subsequent time event occurs, the first actuator is manually actuated and the manual actuation triggers the measuring and recording of a subsequent time by the time measuring means,
   wherein the timekeeping device also comprises an assignment means and a second actuator and
   to each of the recorded subsequent times is automatically assigned one of the multiple entities by the assignment means
   and at a later stage after the automatic assignment of a first entity to a first recorded time may be manually reassigned a second entity of the multiple entities by the use of the second actuator, wherein the second actuator facilitates
   the manual selection of the second entity and
   the manual selection of the first recorded time,
   the linking of the selected second entity to the selected first recorded time,
   wherein the linking of the selected second entity to the selected first recorded time by the second actuator triggers the assignment means to reassign the second entity to the first recorded time,
   such that the manually triggered time measuring and recording is chronologically separated from the manual reassignment of an entity,
   wherein the first actuator provides at least two different kinds of manual actuation during the start phase and the at least two different kinds of manual actuation trigger the time measuring and recording of multiple individual start times, such that an individual start time is recorded for each of the multiple entities,
   wherein the first kind of manual actuation triggers a first procedure of measuring and recording an individual start time for at least one of the multiple entities and the second kind of manual actuation triggers a second procedure of measuring and recording an individual start time for exactly one of the multiple entities, wherein the first procedure is different from the second procedure,
   to each of the recorded individual start times and the subsequent times is automatically assigned one of the multiple entities by the assignment means
   and at a later stage after the automatic assignment of a first entity to a first recorded time, which is either a recorded individual start time or a recorded subsequent time, may be manually reassigned a second entity of the multiple entities by the use of the second actuator, and wherein the second actuator facilitates
   the manual selection of the second entity and
   the manual selection of the first recorded time to which the first entity is currently assigned,
   the linking of the selected second entity to the selected first recorded time.

2. The method according to claim 1, wherein the different kinds of manual actuation of the first actuator during the start phase are distinguishable by a duration of the time interval between two consecutive manual actuations.

3. The method according to claim 2, wherein a duration of the time interval between two consecutive manual actuations is distinguished by a rapid actuation time $T_R$ being predefined by the time measuring means, wherein
   a first kind of manual actuation is provided by a rapid actuation, which is characterized by at least two consecutive actuations and the respective time interval between two consecutive actuations, in which the first actuator is not actuated, being shorter than the rapid actuation time $T_R$ and
   a second kind of manual actuation is provided by a single actuation, which is characterized by strictly one manual actuation wherein during a first time interval before this manual actuation lasting for the rapid actuation time $T_R$ and a second time interval after this manual actuation lasting for the rapid actuation time $T_R$ no further actuation is performed.

4. The method according to claim 3, wherein a rapid actuation triggers the recording of one actuation time as a uniform start time for at least as many entities as consecutive actuations have occurred within the rapid actuation, wherein the uniform start time is given by a time being measured when the first of the consecutive rapid actuations is performed.

5. The method according to claim 4, wherein at least two kinds of gestures, a first gesture and a second gesture, are performed by a part of a body being recognized by at least a sensor and being predefined by the time measuring means, wherein
   the second kind of measuring and recording an individual start time is provided by one single first gesture and
   a third kind of measuring and recording an individual start time is triggered by one single second gesture.

6. The method according to claim 1, wherein in the run phase to each of the recorded possibly multiple subsequent times is automatically assigned one of the multiple entities by an assignment means, wherein the assignment means
   either uses a circular order of the entities for the automatic assignments of the entities, wherein the circular order is defined by a linear order, wherein in the circular order the last entity of the linear order is succeeded by the first entity of the linear order,
   or calculates for each subsequent time the most probable entity from the multiple entities to assign, wherein the calculation is based on a statistical method that evaluates recorded times from preceding time measurings for the multiple entities.

7. The method according to claim 6, wherein by manually reassigning to the first recorded time the second entity which was assigned to a second recorded time before, to the second recorded time as well as to any recorded times that were recorded between the first recorded time and the second recorded time are reassigned a new entity from the multiple entities.

8. The method according to claim 6, wherein by the reassignment of the second entity from a second recorded time, to which the second entity was assigned before the reassignment, to the first recorded time the circular order of the multiple entities is changed to a new circular order in such a way, that the second entity is removed from its current order position and is moved to a new order position, such that
if the second recorded time succeeded the first recorded time, the second entity is the predecessor of the first entity, and the possibly multiple recorded times, that succeed the first recorded time, are reassigned according to the new circular order or
if the second recorded time preceded the first recorded time, the second entity is the successor of the first entity, and the possibly multiple recorded times that precede the first recorded time, but do not precede the second recorded time, are reassigned according to the new circular order.

9. The method according to claim 1, wherein the method further comprises:
the recorded first start time during the start phase is recorded as an absolute clock time measured with respect to a timer,
the recorded multiple individual start times during the start phase are recorded as time intervals measuring the elapsed time since the first start time, and
the recorded possibly multiple subsequent times during the run phase are also recorded as time intervals measuring the elapsed time since the first start time, and
a multi time series of recorded times is established comprising in the order of their recording
i. the first start time,
ii. the multiple individual start times,
iii. the possibly multiple subsequent times,
wherein to each recorded individual start time and to each of the possibly multiple subsequent times are assigned one of the multiple entities.

10. The method according to claim 9, wherein the recorded first start time is recorded as a world start time measured with respect to a world clock timer that indicates an absolute world time.

11. The method according to claim 10, wherein the method further comprises:
by a manual actuation of a third actuator the recorded times for each of the multiple entities are saved,
for each of the multiple entities an individual time series is extracted from the multi time series of recorded times, wherein the individual time series comprises
i. an individual start time, to which the respective entity is assigned,
ii. possibly multiple subsequent times to which the respective entity is assigned,
wherein the subsequent time that is the final recorded time for the respective entity, is called an individual final stop time, and in case there are preceding subsequent times that are recorded for the respective entity, these preceding possibly multiple subsequent times are called individual split times,
for each of the multiple entities its individual time series is saved.

12. The method according to claim 11, wherein for each individual time series
the respective individual start time is saved as an absolute clock time calculated from the absolute clock time of the first start time and the elapsed time from the first start time to the respective individual start time, and
the respective possibly multiple individual split times and the respective individual final stop time are saved as time intervals measuring the elapsed time since the respective individual start time.

13. A timekeeping device for simultaneously timing multiple entities, wherein during timing each of the multiple entities runs through a process starting with a start time event in a start phase followed by at least one subsequent time event in a run phase, the timekeeping device comprising
a first actuator designed to be manually actuatable, wherein a manual actuation of the first actuator triggers the time measurement for an event to be timed
a time measuring means for time measuring of events, wherein through a manual actuation of the first actuator the time measuring means is triggered to measure and record an actuation time, and the time measuring means is designed to measure and record at least
a first start time in the start phase and
multiple subsequent times in the run phase,
wherein
the device further comprises
an assignment means for assigning and reassigning to a recorded subsequent time one of the multiple entities
a second actuator, wherein the second actuator is designed to enable
a manual selection of a second entity of the multiple entities that is currently assigned to a second recorded time and
a manual selection of a first recorded time to which is currently assigned a first entity of the multiple entities and
a manual linking of the selected second entity to the selected first recorded time,
and the second actuator is further designed to trigger the assignment means to reassign the second entity to the first recorded time, when the manual linking of the selected second entity to the selected first recorded time is performed
wherein the second actuator is designed as a second touchable area on a touch screen, and
wherein the second touchable area displays at least
a first record, composed of the first recorded time and its currently assigned first entity, and
a second record, composed of a second recorded time and its currently assigned second entity,
and the manual actuation of the second actuator, in order to reassign the second entity to the first recorded time, is achieved by
manually selecting the second entity by tapping on the second record,
manually selecting the first recorded time by dragging the second record to the first record, and
manually linking the selected second entity to the selected first recorded time by dropping the second record onto the first record.

14. A method for simultaneously timing multiple entities using a timekeeping device comprising a first actuator and a time measuring means, wherein during timing each of the multiple entities runs through a process starting with a start time event in a start phase followed by at least one subsequent time event in a run phase, the method comprising:
- in the start phase, when a first start time event occurs, the first actuator is manually actuated and the manual actuation triggers the measuring and recording of a first start time by the time measuring means,
- in the run phase following the start phase, when a subsequent time event occurs, the first actuator is manually actuated and the manual actuation triggers the measuring and recording of a subsequent time by the time measuring means,
- wherein the timekeeping device also comprises an assignment means and a second actuator and
- to each of the recorded subsequent times is automatically assigned one of the multiple entities by the assignment means
- and at a later stage after the automatic assignment of a first entity to a first recorded time may be manually reassigned a second entity of the multiple entities by the use of the second actuator, wherein the second actuator facilitates
  - the manual selection of the second entity and
  - the manual selection of the first recorded time,
  - the linking of the selected second entity to the selected first recorded time,
- wherein the linking of the selected second entity to the selected first recorded time by the second actuator triggers the assignment means to reassign the second entity to the first recorded time,
  - such that the manually triggered time measuring and recording is chronologically separated from the manual reassignment of an entity, and
- wherein the second actuator is provided by a second touchable area on a touch screen, wherein the second touchable area displays at least
  - a first record, composed of the first recorded time and its currently assigned first entity, and
  - a second record, composed of a second recorded time and its currently assigned second entity,
- and the manual actuation of the second actuator in order to reassign the second entity to the first recorded time is achieved by tapping on the second record, dragging it and dropping it onto the second record.

15. A timekeeping device for simultaneously timing multiple entities, wherein during timing each of the multiple entities runs through a process starting with a start time event in a start phase followed by at least one subsequent time event in a run phase, the timekeeping device comprising:
- a first actuator designed to be manually actuatable, wherein a manual actuation of the first actuator triggers a time measurement for an event to be timed,
- a time measuring means for time measuring of events, wherein, through the manual actuation of the first actuator, the time measuring means is triggered to measure and record an actuation time, and the time measuring means is designed to measure and record at least:
  - a first start time in the start phase and
  - multiple subsequent times in the run phase,
- wherein the device further comprises:
  - an assignment means for assigning and reassigning to a recorded subsequent time of one of the multiple entities
  - a second actuator, wherein the second actuator is designed to enable
    - a manual selection of a second entity of the multiple entities that is currently assigned to a second recorded time and
    - the manual selection of a first recorded time to which is currently assigned a first entity of the multiple entities and
  - a manual linking of the selected second entity to the selected first recorded time,
- and the second actuator is further designed to trigger the assignment means to reassign the second entity to the first recorded time, when the manual linking of the selected second entity to the selected first recorded time is performed,
- wherein the first actuator provides at least two different kinds of manual actuation during the start phase in order to allow a capturing of individual start times for different starting situations, such that the individual start time is recorded for each of the multiple entities,
- wherein the time measurement means is designed to recognize and differentiate the different kinds of manual actuations accepted by the first actuator during the start phase,
- wherein the recognized kind of manual actuation determines the recording of an actuation time as the individual start time to one or more of the multiple entities,
- wherein the first actuator includes at least one second sensor and the at least one second sensor is included in an electronic glove, and
- wherein the at least one second sensor is designed to recognize a kind of gesture that is performed with the electronic glove.

* * * * *